United States Patent
Lytal

(10) Patent No.: US 6,884,351 B1
(45) Date of Patent: Apr. 26, 2005

(54) PROCESS FOR DEGRADING SEWAGE MATTER AND COMPOSITIONS OF SAME

(76) Inventor: Mary L. Lytal, 727 Saint Ann St., New Orleans, LA (US) 70116

( * ) Notice: Subject to any disclaimer, the term of this patent is extended or adjusted under 35 U.S.C. 154(b) by 148 days.

(21) Appl. No.: 10/431,218

(22) Filed: May 7, 2003

Related U.S. Application Data

(60) Provisional application No. 60/378,809, filed on May 8, 2002.

(51) Int. Cl.⁷ .............................. C02F 3/00; B09B 3/00; C12N 1/00; C12N 1/20
(52) U.S. Cl. ........................ 210/601; 210/620; 210/606; 435/252.4; 435/252.1; 435/252.5; 435/255.2; 435/262.5; 435/289.1
(58) Field of Search ................................. 210/601, 620, 210/606; 435/252.4, 252.1, 252.5, 255.2, 262.5, 289.1

(56) References Cited

U.S. PATENT DOCUMENTS

2004/0222372 A1 * 11/2004 McLoughlin et al. ........ 250/288

* cited by examiner

Primary Examiner—Chester T. Barry
(74) Attorney, Agent, or Firm—Fulbright & Jaworski LLP; David L. Fox

(57) ABSTRACT

The present invention is directed to methods of remediating sewage matter, reducing the amount of sludge in sewage and reducing odor-causing matter in sludge. The invention is further directed to compositions having specific genetic characteristics useful in bioremediation of sewage matter and methods of producing same.

21 Claims, 10 Drawing Sheets

PROCESS FOR DEGRADING SEWAGE MATTER AND COMPOSITIONS OF SAME

This application is a non-provisional of and claims priority to parent application No. 60/378,809 filed May 8, 2002.

TECHNICAL FIELD

The present invention relates to the fields of bioremediation, microbiology, and environmental science. The invention is directed to a bioremediation system comprising a microbial mixture, having specific genetic characteristics, that initiate the conversion of sewage matter into environmentally innocuous products, that reduce the amount of sludge matter in sewage treatment systems, and that remove odor-causing matter from sludge. The invention is further directed to methods of preparing and methods of using the bioremediation system.

BACKGROUND OF THE INVENTION

Sewage Treatment

Generally, municipal sewage plants have treatment systems that use an influent pretreatment unit to remove substantial amounts of non-organic matter and separate waste water. The waste water is then discharged in to a holding well and is optionally used downstream. The remaining sewage matter is transferred to a primary settling tank, in which solids precipitate. Solids collected from the primary settling tanks are pumped to waste solids digesters having bacteria that digest the solids. In one method commonly used, the solids remaining after digestion, including biological matter, are transferred to an unheated digester for settling, which occurs after about 6 to 12 hours. The settled sludge is then pumped to a drying bed, compressed and transferred to an incinerator for heat processing. Incineration requires air scrubbers to remove any potentially hazardous components that may get released into the environment. In some cases, the sludge is pumped to sand drying beds to dry and is then hand shoveled prior to being hauled to incinerators. Sewage matter or sludge remaining after heat treatment is placed in land fills and/or bio-waste dumps.

The steps of removing, processing and transferring sludge from sewage is costly and effects a low handling capacity. These factors are improved if the amount of sludge generated in the sewage treatment process is reduced. Conventional sewage treatment involves the step of digestion with naturally-occurring bacteria, including aerobic and/or anaerobic bacteria. Anaerobic approaches are generally thought to be less expensive and less invasive than aerobic approaches, largely due to the high cost and engineering challenge associated with the subsurface delivery of oxygen for aerobic treatment and the need for large amounts of storage capacity. However, the products of anaerobic digestion present problems such as corrosion and odor. Efforts to improve the removal of waste and xenobiotics, which includes any synthetic compound that is not natural to an environment, such as pesticides, detergents and plastics, are currently being made in the area of bioremediation.

Bioremediation

The "principle of microbial infallibility" (Alexander, 1965) is an expression of the empirical observation that, in favorable environmental conditions, there are no natural organic compounds which are totally resistant to biodegradation. Bioremediation processes exploit this theory by using populations of microorganisms to a clean contaminated site. These processes include bioenhancement, which involves natural populations of microorganisms, and bioaugmentation, which involves specially developed microbial cultures that are commonly propagated by fermentation. The efficacy and success of bioremediation treatment depends upon several factors including the chemical and physical properties of a contaminated matrix and the effectiveness of the microbial culture/s and treatment protocol.

Various microorganisms have been found to detoxify a number of toxic chemical pollutants (see, for example, G. Chaudry, 1984). Biodegradation or detoxification of chemical pollutants is normally the result of one or more enzymatic reactions, including oxidation, reduction, hydrolysis, and conjugation (see, for example, D. W. Connell, & G. J. Miller, 1984). For example, microbes such as *Pseudomonas* spp., *Mycobacterium* and *Norcardia*, are known to consume hydrocarbons by oxic degradation and, thus, are able to degrade active ingredients in herbicides.

A factor limiting the efficacy of prior art bioremediation processes is the tendency of microorganisms to lose viability and decline in number following their introduction to the remediation site. This has been demonstrated with respect to bioremediation of contaminated soil (see, for example, J. D. van Elsas, & C. E. Heijnen, 1990). Factors that work against the propagation and survival of microorganisms include: competition with other organisms for nutrients, water and space; parasitism, antibiosis and predation by other organisms; and unfavorable physicochemical parameters, including sub-optimal pH, water and oxygen concentrations. In the case of polluted sewage systems, problems associated with survival and propagation of microorganisms introduced for bioremediation may be exacerbated by the presence of toxic pollutants at concentrations which are inimical to microbial growth.

Examples in the art directed to systems and methods to overcome these deficiencies have been described. For example, U.S. Pat. No. 6,204,049 to Bennett et al. describes a composition for remediating a polluted medium by degrading chemical pollutants comprising an inoculum of *Marasmiellus troyanus*, an alginate carrier and a nutrient. U.S. Pat. No. 4,668,512 to Lewis et al. discloses a formulation of fungi with wheat bran to form alginate gel pellets, for the control of soil-borne plant pathogens, wherein the wheat bran provides a nutrient source for the fungus.

In terms of water treatment, several processes directed to denitrification of drinking water have been described (see, for example, Published U.S. application 2002/0020664 to Tartakovsky, et al.). In situ bioremediation of contaminated water using a microbial biofilter is described in U.S. Pat. Nos. 6,165,356 and 6,036,852 to Carman et al. The biofilter is formed in situ and comprises a bacteria cell biomass having a longevity of at least 8 weeks. Carman et al. teach that the bacteria is methanotrophic, such as *Methylosinus trichosporium*.

Processes directed to the bioremediation of sewage waste matter have also been described. For example, U.S. Pat. No. 5,811,290 to Varadaraj describes urea-surfactant clathrates and their use in enhancing the microbial degradation of hydrocarbon contaminated soil, water, or sludge. The method comprises applying to the soil, water or sludge a degradation effective amount of a composition consisting essentially of a phosphorous source and at least one urea non-ionic surfactant adduct, wherein the urea and non-ionic surfactant in the adduct are present in a weight ratio ranging from about 98:2 to about 75:25; and wherein the composition has a N:P ratio ranging from about 10:2 to about 10:0.5; and the applying of the composition is carried out to provide in the soil, water, or sludge a C:N:P ratio of about 100: 10:1 to about 100:1:001 based on the weight percent of hydrocarbon contaminate in the soil, water or sludge.

U.S. Pat. No. 6,254,776 to Seagle describes a bioremediation system and method for treating farm animal waste to remove volatile organic compounds ("VOC") from wastewater treatment pits, and, thus control smell, is disclosed. The farm animals are housed in structures equipped with grated flooring to permit animal waste to fall into pits or reservoirs below. The pits contain water inoculated with a special assemblage of natural microbes to which oxygen is supplied through piping arranged in the pits. These microbes are taught preferably to be a mixture of 18 naturally occurring aerobic microbes to have an affinity for ammonia and to convert much of the animal waste into carbon dioxide, fatty acids, and water. The system also includes a second piping network situated beneath the grated flooring which serves to create a negative air situation by which escaping foul-smelling air is pulled back into the wastewater to permit further action on the VOC by the microbes in the water. This bioremediation process is taught to result in less odor emitted and fewer waste solids to be disposed of, further processed, or placed directly in storage lagoons.

Another consideration in the design of an effective bioremediation system is the lifetime of the microbes in the system. To supply microbes, bacterial culturing systems are known that produce bacteria on site, for example, at a waste treatment plant. However, these systems use elaborate culturing systems. U.S. Pat. No. 6,087,155 to York, et al. teaches an on site bioremediation system that delivers logarithmically growing, active microorganisms from a culture vessel directly to the biodegradable waste to be metabolized. York et al. describe the bioremediation system including a controller, culture vessel and separate containers of stock microorganisms and nutrient medium, and periodic or continuous addition of stock microorganisms and fresh nutrient media is required to obtain a particular cell density. At that density, the active, logarithmically growing microorganisms flow out of the system to the waste site on a periodic or continuous basis. Regardless of the type of matter being subjected to remediation, continuous treatment requirements increase the costs associated with the treatment.

Prior to the present invention, processes directed to reduce the amount of solid matter, sludge and odor in sewage have lacked time- and cost-effectiveness for applications in sewage plants. There accordingly remains a need in the art for inexpensive, simplified systems and methods for the in situ bioremediation of sewage matter, in particularly, remediating sludge, odor-causing matter and illegal contaminants from the sewer. As described herein, the present invention provides these advantages in the field of sewage treatment. More particularly, the present invention provides an in situ bioremediation system that remains effective over long periods of time without requiring post-processing of, or transfer of sludge. Consequently, the present invention provides a system and method that affords increased handling capacity, decreased cost associated with treatment, and increased environmental safety in the treatment of sewage matter.

BRIEF SUMMARY OF THE INVENTION

The present invention is directed to a microbial bioremediation system and methods of use which provide sewage treatment processes that improve handling capacity by reducing sludge in situ. Some aspects of the invention may be summarized but not limited to the following:

There is provided: a microbial mixture characterized by having DNA signature bands at about 3189 base pairs and at about 1737 base pairs.

In addition there is also provided a composition of matter, further comprising the above and having DNA signature bands at about 3437 base pairs, at about 991 base pairs, and at about 676 base pairs.

In addition, there is provided a composition of matter according to the first composition, further comprising the microbial mixture characterized by having about 23% relative ratio of m/e equal to 264 and about 38% relative ratio of an m/e equal to 414.

Also there is provided another composition of matter that comprises a microbial mixture further comprising a prokaryote, wherein the mixture is characterized by having DNA signature bands at about 3189 base pairs and at about 1737 base pairs.

Further to the previous composition, there is provided a microbial mixture, further comprising having DNA signature bands at about 3437 base pairs, at about 991 base pairs and at about 676 base pairs.

Additionally, there is provided a microbial mixture, further comprising a prokaryote, further comprising the mixture characterized by having about 40% relative ratio of an m/e equal to 264 and about 32% relative ratio of m/e equal to 414.

Also there is provided a microbial mixture comprising a yeast, wherein the mixture is characterized by having DNA signature bands at about 3189 base pairs and at about 1737 base pairs.

Additionally, there is provided a microbial mixture comprising a yeast, further comprising having DNA signature bands at about 3437 base pairs, at about 991 base pairs and at about 676 base pairs.

Further to the first microbial mixture comprising a yeast, there is provided a mixture, further characterized by having about 23% relative ratio of an m/e equal to 264 and about 38% relative ratio of an m/e equal to 414.

Another composition of matter provided by the present invention is a microbial mixture comprising a prokaryote and a yeast, wherein the mixture is characterized by having DNA signature bands at about 3189 base pairs and at about 1737 base pairs.

Additionally, there is provided a composition, comprising a mixture of a prokaryote and a yeast, further comprising having DNA signature bands at about 3437 base pairs, at about 991 base pairs and at about 676 base pairs.

Additionally there is provided a composition comprising a prokaryote and a yeast, further being characterized by having about 23% relative ratio of an m/e equal to 264 and about 38% relative ratio of an m/c equal to 414.

There is also provide a bioremediation system produced by a process comprising the steps of: preparing a predetermined volume of a media having (i) less than about 2 ppm chlorine, (ii) a pH in the range of about 6.0 to about 9.0, (iii) a nutrient source having about 30% nitrogen, about 10% phosphate, and about 10% potassium, (iv) an enzyme and (v) a yeast cell; adding a starter bacteria, wherein said starter bacteria comprises at least one cell of an anaerobic bacteria and at least one cell of an aerobic bacteria; and incubating for at least about 36 hours at a temperature in the range of about 20° C. to about 37° C. to provide a liquid bioremediation system.

There is further provided a bioremediation system wherein the anaerobic bacteria is a *Bacillus* sp.

There is further provided according to the above, a bioremediation system wherein the aerobic bacteria is a *Bacillus* sp.

There is further provided, according to the above, a bioremediation system wherein the enzyme digests a carbohydrate, a protein, a lipid, or a surfactant.

There is further provided, according to the above, a bioremediation system wherein the yeast is a *Saccharomyces* sp.

There is further provided, according to the above, a bioremediation system, wherein the yeast is in a dry form.

There is further provided, according to the above, a bioremediation system comprising adding elements to the media.

There is further provided, according to the above, a bioremediation system wherein the added elements comprise iron, boron, manganese, zinc, molybdenum, copper, or combinations thereof.

There is further provided, according to the above, a bioremediation system further comprising maintaining the predetermined volume by adding water having less than 2 ppm chlorine.

There is further provided, according to the above, a bioremediation system, further comprising maintaining the phosphorous, nitrogen and potassium containing compositions.

There is further provided, according to the above, a bioremediation system further comprising the step of adding a starch containing material to the liquid bioremediation system to form a solid bioremediation system.

There is further provided, according to the above, a bioremediation system wherein the starch comprises corn meal, wheat bran, rice bran, or other cellulose containing material.

There is additionally provided, according to the above, a bioremediation system wherein the corn meal is white corn meal.

There is additionally provided a process, further comprising the step of drying the solid for at least about 48 hours.

There is also provided a method of running a sewage treatment system comprising the steps of treating sewage with a microbial composition characterized by having DNA signature bands at about 3189 base pairs and at about 1737 base pairs, for a time sufficient to reduce an amount of solid matter in the sewage without removing mass from the system.

There is additionally provided a method, further comprising the microbial composition being characterized by having DNA signature bands at about 3437 base pairs, at about 991 base pairs and at about 676 base pairs.

There is additionally provided a method according to the above, further comprising the microbial composition being characterized by having about 23% relative ratio of an m/e equal to 264 and about 38% relative ratio of an m/e equal to 414.

There is additionally provided a method according to the above, wherein the solid matter in the sewage is reduced by about 100% relative to the initial amount of solid matter.

There is additionally provided a method according to the above, wherein the solid matter in the sewage comprises total suspended solids.

There is additionally provided a method according to the above, wherein the total suspended solids is reduced by about 36% in about five days.

There is additionally provided a method according to the above method, wherein the total suspended solids is reduced by an amount in the range of about 34% to about 40% in about 18 days.

There is additionally provided a method according to the above, wherein the solid matter comprises volatile suspended solids.

There is additionally provided a method according to the above, wherein the volatile suspended solids are reduced by about 30% in about five days.

There is further provided a method according to the above, wherein the volatile suspended solids are reduced by an amount in the range of about 23% to about 36% in about 18 days.

There is also provided a method for treating sewage comprising the step of contacting sewage with a microbial composition characterized by having DNA signature bands at about 3189 base pairs and at about 1737 base pairs, for a time sufficient to reduce an amount of solid matter in the sewage as compared to a control.

Additionally, the above method is further characterized, wherein the sewage comprises dissolved oxygen in an amount of at least about 0.5 ppm.

Additionally, the above method is further characterized, wherein the sewage comprises dissolved oxygen in an amount of at least about 1.0 ppm.

Additionally, the above method is further characterized by comprising the composition characterized by having DNA signature bands at about 3437 base pairs, at about 991 base pairs and at about 676 base pairs.

Additionally, the above method is further characterized by comprising the composition characterized by having about 23% relative ratio of m/c equal to 264 and about 38% relative ratio of m/e equal to 414.

Additionally, the above method is further characterized, wherein the solid matter comprises total suspended solids.

Additionally, the above method is further characterized, wherein the total suspended solids is reduced by at least about 15%.

Additionally, the above method is further characterized, wherein the total suspended solids is reduced in the range of about 15% to about 148%.

Additionally, the above method is further characterized, wherein the time is between about one month to about three months.

Additionally, the above method is further characterized, wherein the total suspended solids is reduced in the range of about 26% to about 94%.

Additionally, the above method is further characterized, wherein the total suspended solids is reduced in the range of about 26% to about 75%.

Additionally, the above method is further characterized, wherein the solid matter comprises volatile suspended solids.

Additionally, the above method is further characterized, wherein the volatile suspended solids are reduced by at least about 8%.

Additionally, the above method is further characterized, wherein the volatile suspended solids are reduced in the range of about 8% to about 160%.

Additionally, the above method is further characterized, wherein the time is about one month to about three months.

Additionally, the above method is further characterized, wherein the volatile suspended solids are reduced in the range of about 22% to about 95%.

Additionally, the above method is further characterized, wherein the volatile suspended solids are reduced in the range of about 25% to about 72%.

There is also provided a method of reducing sludge in a sewage plant comprising the step of treating the sludge with an effective amount of a microbial composition characterized by having DNA signature bands at about 3189 base pairs and at about 1737 base pairs, for a time sufficient to reduce an amount of sludge as compared to a control.

Additionally, the method above may be further characterized as comprising the composition having DNA signature bands at about 3437 base pairs, at about 991 base pairs and at about 676 base pairs.

Additionally, the method above may be further characterized as comprising the composition having about 40% relative ratio of m/e equal to 264 and about 32% relative ratio of m/e equal to 414.

Additionally, the method above may be characterized, wherein the sewage comprises dissolved oxygen in an amount of at least about 0.5 ppm.

Additionally, the method above may be characterized, wherein the sewage comprises dissolved oxygen in the amount of at least about 1.0 ppm.

Additionally, the method above may be characterized, wherein the solid matter comprises total suspended solids.

Additionally, the method above may be characterized, wherein the total suspended solids is reduced by at least about 15%.

Additionally, the method above may be characterized, wherein the total suspended solids is reduced in the range of about 15% to about 148%.

Additionally, the method above may be characterized, wherein the time is between about one month to about three months.

Additionally, the method above may be characterized, wherein the total suspended solids is reduced in the range of about 26% to about 94%.

Additionally, the method above may be characterized, wherein the total suspended solids is reduced in the range of about 26% to about 75%.

Additionally, the method above may be characterized, wherein the solid matter comprises volatile suspended solids.

Additionally, the method above may be characterized, wherein the volatile suspended solids are reduced by at least about 8%.

Additionally, the method above may be characterized, wherein the volatile suspended solids are reduced in the range of about 8% to about 160%.

Additionally, the method above may be characterized, wherein the time is about one month to about three months.

Additionally, the method above may be characterized, wherein the volatile suspended solids are reduced in the range of about 22% to about 95%.

Additionally, the method above may be characterized, wherein the volatile suspended solids are reduced in the range of about 25% to about 72%.

The invention further provides a method of determining the presence of an illegal component in sewage comprising the steps of measuring a first amount of total suspended solids in the sewage; treating the sewage with an effective amount of a microbial composition characterized by having DNA signature bands at about 3189 base pairs and at about 1737 base pairs; and determining a second amount of total suspended solids in the treated sewage, wherein an increase in the second amount as compared to the first amount indicates the presence of the illegal component.

Additionally, the method above may be characterized as further comprising the composition having DNA signature bands at about 3437 base pairs, at about 991 base pairs and at about 676 base pairs.

Additionally, the method above may be characterized as further comprising the composition having about 23% relative ratio of m/e equal to 264 and about 38% relative ratio of m/e equal to 414.

Additionally, the method above may be characterized, wherein the increase in the second amount is equal to or greater than about 9%.

Finally, there is also provided a method of removing odor-causing matter in sewage comprising the step of treating the sewage with a microbial composition characterized by having DNA signature bands at about 3189 base pairs and at about 1737 base pairs, for a time sufficient to remove an amount of odor-causing matter as compared to the initial amount in the sewage.

Additionally, the method above may further comprise the composition characterized by having DNA signature hands at about 3437 base pairs, at about 991 base pairs and at about 676 base pairs.

Additionally, the method above may further comprise the composition characterized by having about 23% relative ratio of m/e equal to 264 and about 38% relative ratio of m/e equal to 414.

Additionally, the method above may be characterized, wherein the odor-causing matter comprises volatile suspended solids.

Additionally, the method above may be characterized, wherein the time is about 24 to about 48 hours.

Additionally, the method above may be characterized, wherein the sewage comprises dissolved oxygen in the amount of at least about 0.2 ppm.

Additionally, the method above may be characterized, wherein the sewage comprises dissolved oxygen in the amount of at least about 0.5 ppm.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Definitions

Figure 1:
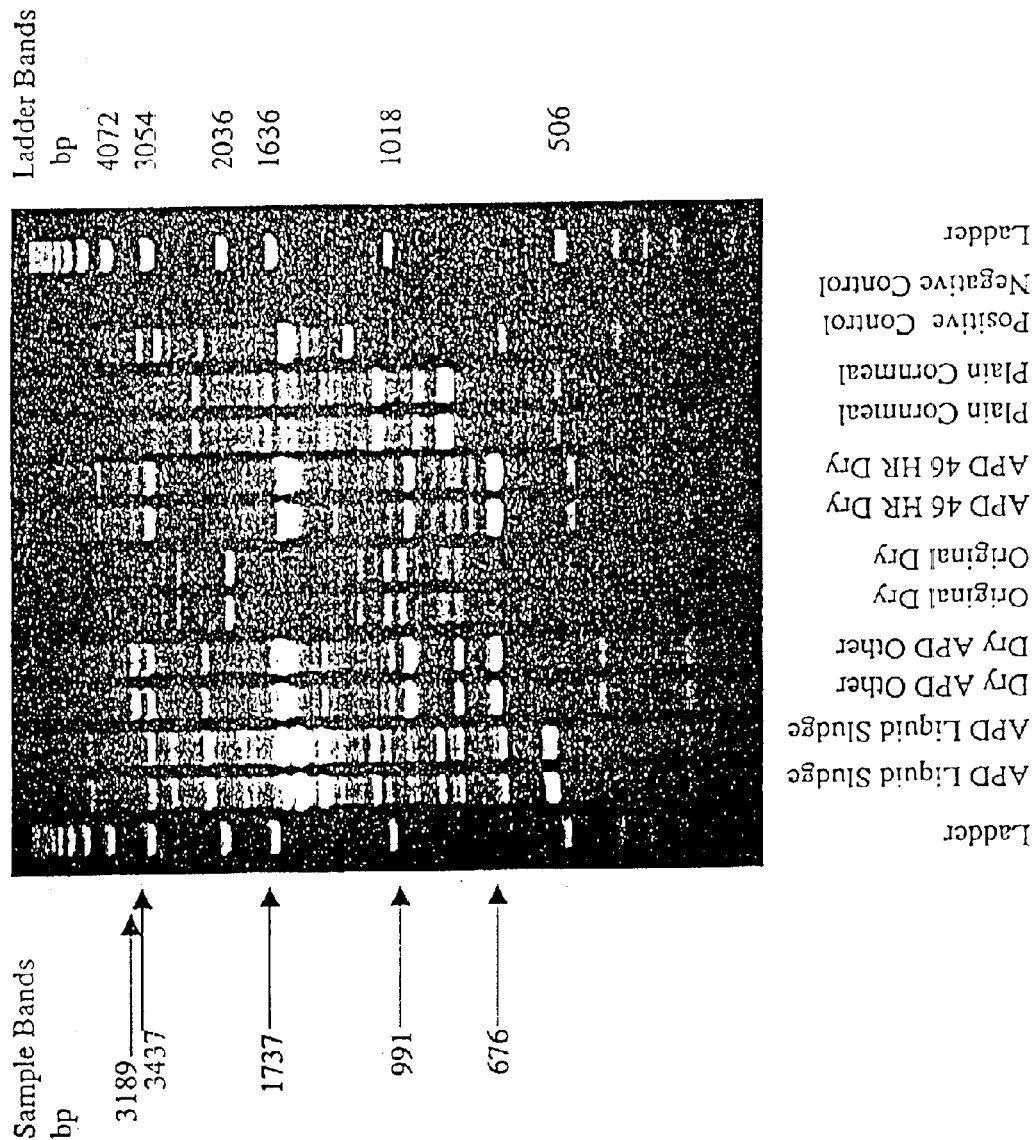
FIG. 1 is a DNA fingerprint of various samples of the bioremediation system as compared to an unprocessed control.

The term "biomass," as used herein, refers to the total mass of living or formerly-living (i.e., dead cells, cellular debris) matter within a given or defined volume of environment.

The term "bioremediation," as used herein, refers to a process of cleaning, removing, reducing, or decreasing an amount of a contaminant, pollutant or environmentally unsafe component from matter by enhancement of either natural populations of microorganisms or by adding high amounts of specially developed microbial cultures, especially those propagated by fermentation.

The term "B.O.D.," as used herein, refers the biochemical oxygen demand, which is a measurement of how much oxygen is needed from the environment, for example.

The term "DNA signature band," as used herein, refers to a band of a discrete size, usually given in terms of base pairs, and concentration that is specific to a sample. For purposes of the present invention, the DNA signature band is obtained by DNA fingerprinting.

The term "dissolved oxygen," as used herein, refers to gaseous elemental or molecular oxygen that is dissolved in a liquid medium.

The term "enzyme," as used herein, refers to protein or polypeptide that functions as a catalyst in a catabolic reaction. The enzymes of the present invention include, for example, a hydrolase, which hydrolyzes a substrate. More specifically, the enzymes of the present invention digest at least one of a carbohydrate, a protein, a lipid, or a surfactant.

The term "illegal component in sewage," as used herein, refers to a component of sewage that does not comply with the EPA standard for the use and disposal of sewage sludge (biosolids), as indicated under 40 CFR Part 503.

The term "m/e," as used herein, refers to a mass-to-charge ratio of a component having a specific mass. Mass spectrometry provides detection of mass-to-charge signals, which are denoted as "m/e" in the art. For example, a mass value of m/e equal to 264 indicates a component having a mass of 264 as detected by the mass spectrometer.

The term "microbe," as used herein, refers to: prokaryotes such anaerobic or aerobic bacteria as know in the art; eukaryotes such as organisms having well defined nuclei, mitochondria, golgi bodies and endoplasmic reticulum, preferably fungi, more preferably yeasts and the like.

The term "POTW," as used herein, refers to publicly owned treatment works or sewage treatment plant.

The term "prokaryote," as used herein, refers to a cellular organism that does not have a distinct nucleus. An exemplary prokaryote of the present invention is an anaerobic bacteria or an aerobic bacteria and is preferably a species of *Bacillus*.

The term "odor-causing matter," as used herein, refers to matter that is sufficiently volatile to effect a distinct odor to the environment. The measurement of odor can be qualitative or quantitative. To remove odor-causing matter, it is meant that the odor is reduced, diluted, quenched, removed, prevented, contained and/or controlled.

The term "starch," as used herein, refers to a polymeric material that provides an adsorbent or absorbent quality. Non-limiting examples of suitable starches for the present invention include corn meal, wheat bran, rice bran, or cellulose.

The term "sludge," as used herein, refers to sediment or slushy matter such as that precipitated by the treatment of sewage or collected in a boiler. Sludge is characterized by the amount of total suspended solids and/or the amount of volatile suspended solids therein.

The term "total suspended solids," as used herein, refers to an amount of components in sewage that are not dissolved in an aqueous phase, which may include organic, inorganic, and/or biological matter.

The term "volatile suspended solid," as used herein, refers to a component of sewage that is characterized by a low boiling point.

The term "yeast," as used herein, refers to a unicellular fungi. The yeast of the present invention includes a budding yeast such as *Saccharomyces* or a fission yeast such as *Schizosaccharomyces*. As a nutrient, yeast is about 50 percent protein and is a rich source of B vitamins, niacin, and folic acid.

The Present Invention

A. The Composition

The compositions of the present invention comprise a microbial mixture that degrades the solid matter and/or odor-causing matter in sewage without requiring the removal of sludge during active processing, which provides substantial environmental and financial benefits over conventional sewage digestion processes. The composition of the present invention comprises at least one anaerobic bacteria and at least one aerobic bacteria. In specific embodiments, these bacteria are a species of *Bacillus*, although other bacteria are contemplated that provide the specific genetic characteristics described herein.

In certain embodiments, the composition comprises an enzyme that is capable of digesting compounds such as a carbohydrate, a protein, a lipid, or a surfactant. The composition also includes a yeast, which is preferably a species of *Saccharomyces*. One of ordinary skill in the art is aware that *Saccharomyces* is commonly used in the food industry. Further, standard methods and reagents in the field of yeast molecular genetics, particularly regarding *Saccharomyces cerevisiae*, are well known in the art. References for such methods include *Methods in Yeast Genetics, 2000 Edition: A Cold Spring Harbor Laboratory Course Manual* (Burke et al., 2000) and *Current Protocols in Molecular Biology*, Chapter 13 (Ausubel et al., 1994), both incorporated by reference herein. Non-limiting examples of species of *Saccharomyces* include *S. cerevisiae, S. italicus, S. oviformis, S. capensis, S. chevalieri, S. douglasii, S. paradoxus, S. cariocanus, S. kudriavzevii, S. mikatae, S. bayanus, S. carlsbergensis*, and *S. pastorianus*.

In certain embodiments, the composition comprises elemental-based (i.e. "elements") nutrients that contain nitrogen, phosphorous and potassium that are added for processing the microbial mixture. In further embodiments, the composition further comprises trace amounts of these elements that serve as micronutrients for the microbial mixture: these include but are not limited to, for example, iron, boron, manganese, zinc, molybdenum, copper, or any combination thereof.

The composition is provided in a liquid form or in a solid form. The liquid form results directly from the process of preparing the composition as described herein, and the solid form requires further processing. This further process introduces a starch, such as corn meal, wheat bran, rice bran, or cellulose into the composition. If a long shelf-life is desired, then the solid form is preferentially prepared.

An exemplary composition of the present invention comprises a microbial mixture characterized by having DNA signature bands at about 3189 base pairs and at about 1737 base pairs. In further embodiments, the mixture has characteristic DNA signature bands at about 3437 base pairs, at about 991 base pairs and at about 676 base pairs. In another embodiment, the mixture is characterized by having about 40% relative ratio of m/e equal to 264 and about 32% relative ratio of m/e equal to 414.

In certain embodiments, the microbial mixture comprises a prokaryote, a yeast, or a combination thereof, wherein the mixture is characterized by having DNA signature bands at about 3189 base pairs and at about 1737 base pairs.

The compositions of the present invention function as bioremediation systems for the treatment of sewage matter. Such a composition is produced by a process comprising preparing a predetermined volume of a media having (i) less than about 2 ppm chlorine, (ii) a pH in the range of about 6.0 to about 9.0, (iii) a nutrient source having about 30% nitrogen, about 10% phosphate, and about 10% potassium, (iv) an enzyme and (v) a yeast cell; adding a starter bacteria, wherein the starter bacteria comprises at least one cell of an anaerobic bacteria and at least one cell of an aerobic bacteria; and incubating for at least about 36 hours at a temperature in the range of about 20° C. to about 37° C. to provide a liquid composition of the present invention.

In specific embodiments, the anaerobic bacteria is a *Bacillus* sp., and/or the aerobic bacteria is a *Bacillus sp*, and/or the enzyme digests a carbohydrate, a protein, a lipid, grease, oil, or a surfactant. In additional specific embodiments, the yeast is a *Saccharomyces* sp., and/or is provided in the dry form although a yeast cell provided directly from a colony is also contemplated.

It is known in the art that, in certain embodiments, culturing microbes requires micronutrients, and in the present invention, the process of preparing the compositions further comprise adding elements to the media. Non-limiting examples of elements used in the present invention comprise iron, boron, manganese, zinc, molybdenum, copper, or combinations thereof.

In certain embodiments, the process of preparing the composition further comprises maintaining the predetermined volume by adding water having less than 2 ppm chlorine. Addition of water to the composition affects the concentrations of components in solution, such as nutrients. Thus, in further embodiments, addition of nutrients are needed to maintain the initial concentrations, such as, for example, maintaining the phosphorous, nitrogen and potassium compositions.

In certain embodiments, a solid composition of the present invention is desired. In such cases, the composition is prepared by adding a starch to the liquid bioremediation system to form a solid bioremediation system. The liquid bioremediation system is prepared by the process described herein and is a microbial mixture characterized by having DNA signature bands at about 3189 base pairs and at about 1737 base pairs. Non-limiting examples of a starch suitable in the present invention include corn meal, wheat bran, rice bran, or cellulose. In a specific embodiment, the starch is white corn meal. The solid microbial mixture is dried for at least about 48 hours, or until a powder, such as a granular powder is formed. In certain circumstances, a skilled artisan is aware that variables, such as humidity and temperature, that introduce undesirable contributions to the composition are controlled during its processing.

It is noted that the processing steps described herein represent particularly convenient modes of processing. However, one of ordinary skill in the art recognizes that other processing modes consistent with the teachings of this disclosure may be developed through the use of routine experimentation.

B. Methods of Use

The compositions of the present invention are suitable for use in methods directed to the degradation of sewage matter, sludge and odor-causing matter in sewage. The methods provide substantial benefit over the prior art because methods of the present invention do not require removal of sludge during active processing, thereby alleviating the need for transfer and storage of sludge.

In certain embodiments, the present invention provides a method of running a sewage treatment system comprising treating the sewage with a microbial composition characterized by having DNA signature bands at about 3189 base pairs and at about 1737 base pairs, for a time sufficient to reduce an amount of solid matter in the sewage without removing mass from the system. Because removal of mass is not required from sewage treatment systems treated with compositions of the present invention, the composition used does not contribute to biomass generated during the treatment process. In certain embodiments, water and carbon dioxide are generated as the major degradation products, and in such cases, water is removed and replaced with additional sewage requiring treatment. In certain embodiments water and carbon dioxide are generated and the water product is redelivered to other parts of the sewage treatment system and, in this sense, is used as the delivery mechanism for the bioremediation system. Additionally, eventually the water is disinfected and safely discharged into the environment in accordance with the systems design.

The water product generated from the methods of the present invention has a lower biochemical oxygen demand ("B.O.D."), a lower nitrogen and a lower phosphorous content relative to the influent water of incoming sludge. This water product is, in certain embodiments, redelivered into the sewage system, and then disinfected, which kills the bioremediation system of the present invention, and discharged. Therefore, the water product does not contribute adversely to the treatment plant or POTW complying with EPA standards for discharged product. In other embodiments, the water product is used, for example, in agricultural purposes, and particularly in regions of the world in which access to water or access to water suitable for the environment is difficult.

In certain embodiments, the solid matter is reduced by about 100% relative to the initial amount of solid matter in the sewage. The solid matter is quantitated by an amount of total suspended solids and/or an amount of volatile suspended solids in the sewage. In specific embodiments, the total suspended solids is reduced by about 36% in about five days, and this reduction accounts for sewage matter present at the time of treatment and any sewage matter that is added subsequent to the time of treatment. In other specific embodiments, the total suspended solids is reduced by an amount in the range of about 34% to about 40% in about 18 days. In yet other specific embodiments, the volatile suspended solids are reduced by about 30% in about five days. In another specific embodiment, the volatile suspended solids are reduced by an amount in the range of about 23% to about 36% in about 18 days.

In certain exemplary embodiments of the present invention, there is a method for treating sewage comprising contacting the sewage with a microbial composition characterized by having DNA signature bands at about 3189 base pairs and at about 1737 base pairs, for a time sufficient to reduce an amount of solid matter in the sewage as compared to a control. The control is not treated with a composition of the present invention and uses conventional sewage treatment processes for treating the sewage. In specific embodiments, the composition is further characterized by having DNA signature bands at about 3437 base pairs, at about 991 base pairs and at about 676 base pairs. In another specific embodiment, the composition is further characterized by having about 40% relative ratio of m/e equal to 264 and about 32% relative ratio of m/e equal to 414.

In methods of the present invention, dissolved oxygen is needed for efficient function of the microbial composition. In specific embodiments, the sewage comprises dissolved oxygen in the amount of at least about 0.5 ppm. In other specific embodiments, the dissolved oxygen is the amount of at least about 1.0 ppm. One of ordinary skill in the art is aware of methods and standards for determining the amount of dissolved oxygen in a solu tion, including in sludge.

In a specific embodiment, the solid matter comprises total suspended solids. In a further specific embodiment, the total suspended solids is reduced by at least about 15%. In yet another further specific embodiment, the total suspended solids is reduced in the range of about 15% to about 148%, which in yet a further specific embodiment is achieved in about one month to about three months. In another further specific embodiment, the total suspended solids is reduced in the range of about 26% to about 94%. In yet another specific embodiment, the total suspended solids is reduced in the range of about 26% to about 75%.

In a specific embodiment, the solid matter comprises volatile suspended solids and, in a further embodiment, is reduced by at least about 8%. In another further specific embodiment, the volatile suspended solids are reduced in the range of about 8% to about 160%, which, in yet a further embodiment, is achieved in about one month to about three months. In yet other further specific embodiments, the volatile suspended solids are reduced in the range of about 22% to about 95% or in the range of about 25% to about 72%.

In other embodiments of the present invention, a method of reducing sludge in a sewage plant is contemplated. In these methods, the sludge is at least treated with an effective amount of a microbial composition characterized by having DNA signature bands at about 3189 base pairs and at about 1737 base pairs, for a time sufficient to reduce an amount of sludge, for example, as compared to a control. The sewage plant includes any part of the plant such as an aeration chamber or a digester, and any site that stores, treats, processes or provides a holding capacity for sewage, including, for example, a lift station.

In further embodiments, the microbial composition is further characterized by having DNA signature bands at about 3437 base pairs, at about 991 base pairs and at about 676 base pairs. In another further embodiment, the microbial composition is characterized by having about 40% relative ratio of m/e equal to 264 and about 32% relative ratio of m/e equal to 414.

In specific embodiments, the sewage comprises dissolved oxygen in the amount of at least about 0.5 ppm, or of at least about 1.0 ppm, which is determined using methods known in the art.

In other specific embodiments, the solid matter comprises total suspended solids and/or volatile suspended solids. In further specific embodiments, the total suspended solids is reduced by at least about 15% as compared to the control. In another further specific embodiment, the total suspended solids is reduced in the range of about 15% to about 148%, wherein the time for the reduction to occur is between about one month to about three months. In yet another further specific embodiment, the total suspended solids is reduced in the range of about 26% to about 94%, or in the range of about 26% to about 75%.

In specific embodiments that determine an amount of volatile suspended solids, the volatile suspended solids are, in one further specific embodiment, reduced by at least about 8%. In another further specific embodiment, the volatile suspended solids are reduced in the range of about 8% to about 160%, wherein the time is about one month to about three months. In other further specific embodiments, the volatile suspended solids are reduced in the range of about 22% to about 95% or in the range of about 25% to about 72%.

The EPA regulates the suitable components of sewage, but often sewage that is contaminated with an illegal component is not easily identified, if at all, until after the contaminated amount has been transferred to a sewage treatment plant. The present invention provides a method of determining the presence of an illegal component in sewage comprising: measuring a first amount of total suspended solids in the sewage; treating the sewage with an effective amount of a microbial composition characterized by having DNA signature bands at about 3189 base pairs and at about 1737 base pairs; and determining a second amount of total suspended solids in the treated sewage, wherein an increase in the second amount as compared to the first amount indicates the presence of the illegal component. In a specific embodiment, the increase is equal to or greater than about 9%.

In further embodiments, the microbial composition is further characterized by having DNA signature bands at about 3437 base pairs, at about 991 base pairs and at about 676 base pairs and/or by having about 40% relative ratio of m/e equal to 264 and about 32% relative ratio of m/e equal to 414.

In certain embodiments of the present invention, the microbial composition is used to remove odor-causing matter from sewage. Reducing the stench associated with waste, whether human or animal, is particularly advantageous. For example, in the case of animal farming, lagoons are often used as outdoor storage for animal waste much like chambers to store sludge are often used in human sewage treatment. These lagoons vary in size. Prior to transfer to the holding lagoon, animal waste is collected into pits. Animal waste pits currently in operation vary in depth as well as in frequency of solid waste removal. About every 7 days, the pits are emptied into a holding lagoon. Water from the top of the lagoon is pumped back to recharge the pits after waste solids have settled in the lagoon. When soil conditions permit, water from the lagoon is sprayed on crop land for fertilization to prevent the lagoon from overflowing. In colder regions, the pits may be much deeper to permit storage for longer periods or until application to crop land by spraying is possible. However, these lagoons leak manure into underground water systems and carry a very offensive odor, which intensifies with larger quantities of waste, higher ambient air temperature, and poor air quality in general, among other factors.

The reduction in solid waste material, and more particularly the reduction in volatile suspended solids in sewage observed after treatment with the composition of the present invention improves the conditions of, for example, a lagoon by reducing, removing, diluting, or decreasing odor-causing matter therein. The reduction in quantity of solid waste material and any change in the nutritional composition of the waste solids will concomitantly reduce the space required for storage. To this end, the present invention is directed to a method of removing odor-causing matter in sewage comprising treating the sewage with a microbial composition characterized by having DNA signature bands at about 3189 base pairs and at about 1737 base pairs, for a time sufficient to remove an amount of odor-causing matter as compared to the initial amount in the sewage.

In a specific embodiment, the amount of odor-causing matter is determined, monitored or measured using volatile suspended solids. In another specific embodiment, the odor-causing matter is removed, reduced, decreased or diluted in about 24 to about 48 hours. The process requires minimal oxygen, such as, in a specific embodiment, dissolved oxygen in the amount of at least about 0.2 ppm. In another specific embodiment, the dissolved oxygen is in the amount of at least about 0.5 ppm.

C. Characterization of the Composition

The compositions of the present invention were characterized using specific genetic and chemical methods. In addition, other methods that provide structural, physical and chemical information are contemplated. Such methods include metabolic characterization using labeled substrates, protein analysis, and in situ characterization methods.

i. DNA Fingerprinting

Prokaryotic, fungi and mammalian genomes have families of short intergenic repeated sequences, and these repetitive DNA sequences are non-coding sequences of DNA containing short repeated sequences and dispersed throughout the a genome. Interspersed repetitive DNA sequence elements have been characterized extensively in eukaryotes. The conserved nature and interspersed distribution of these repetitive sequences have been exploited to amplify unique sequences between repetitive sequences by the polymerase chain reaction. Additionally, species-specific repetitive DNA elements have been used to differentiate between closely related murine species.

The amplification of sequences between repetitive DNA generates a DNA fingerprint, which is the same for every cell, tissue, and organ of an organism. It cannot be altered by any known treatment. Consequently, DNA fingerprinting serves as a primary method for identifying and distinguishing among individual organisms. DNA fingerprinting is a process that involves amplification of nucleic acids of a specific cell, tissue or organism.

In prokaryotes, the presence of repetitive sequences has been demonstrated in many different bacterial species including the eubacterial genera, Escherichia, *Salmonella, Deinococcus, Calothrix*, and *Neisseria*. The fungi, *Candida albicans* and *Pneumocystis carinii*, illustrate the presence of dispersed extragenic repetitive sequences in many organisms. One such family of repetitive DNA sequences in eubacteria is the Repetitive Extragenic Palindromic ("REP") elements. The consensus REP sequence for this family includes a 38 mer sequence containing six degenerate positions, including a 5 bp variable loop between each side of the conserved stem of the palindrome. Another family of repetitive elements is the Enterobacterial Repetitive Intergenic Consensus (ERIC) sequences. ERIC is larger (consensus sequence is 126-mer) and contains a highly conserved central inverted repeat. The ERIC and REP consensus sequences do not appear to be related.

Studies have employed repeated rRNA genes as probes in Southern blots to detect restriction fragment length polymorphisms ("RFLP") between strains. Repeated tRNA genes have been used as consensus primer binding sites to directly amplify DNA fragments of different sizes by PCR amplification of different strains. Both techniques include the use of radioisotope and methods such as Southern blotting and polyacrylamide gel electrophoresis to clearly distinguish subtle differences in the sizes of the DNA fragments generated. The tDNA-PCR fingerprints are generally invariant between strains of a given species and between related species. Other investigations include the use of species-specific repetitive DNA elements as primer-binding sites for PCR-based bacterial species identification. Though such methods allow species identification by PCR with picogram amounts of DNA, only single PCR products are generated which precludes the generation of strain-specific genomic fingerprints. Thus, species-specific repetitive DNA elements can be used as primer-binding sites for PCR-based bacterial species identification.

Another method is directed to using extragenic repetitive sequences to directly fingerprint bacterial genomes, as described in U.S. Pat. No. 5,691,136 to Lupski et al. Analysis of amplification products resulting from amplifying unique sequences between primers to bacterial DNA repeat sequences, reveals unique distances between repeat sequences. This pattern of distances uniquely fingerprints different bacterial species and strains.

DNA fingerprinting uses DNA amplification processes, which refer to any process that increases the number of copies of a specific DNA sequence. A variety of processes are known in the art. One of the most commonly used is the Polymerase Chain Reaction (PCR) process of Mullis as described in U.S. Pat. Nos. 4,683,195 and 4,683,202 both issued on Jul. 28, 1987. In general, the PCR amplification process involves an enzymatic chain reaction for preparing exponential quantities of a specific nucleic acid sequence. It requires a small amount of a sequence to initiate the chain reaction and oligonucleotide primers which will hybridize to the sequence. In PCR, the primers are annealed to denatured nucleic acid followed by extension with an inducing agent (enzyme) and nucleotides. This results in newly synthesized extension products. These newly synthesized sequences become templates for the primers, and repeated cycles of denaturing, primer annealing, and extension results in exponential accumulation of the specific sequence being amplified. The extension product of the chain reaction is a discrete nucleic acid duplex with a termini corresponding to the ends of the specific primers employed. Because the repetitive DNA sequences are interspersed throughout the genome at different distances from each other, an exponential growth of all the different sizes occurs. The pattern of extension products of different sizes provides a specific fingerprint for each organism.

Several automated PCR amplifying means are known on the art, such as a thermal cycler. There are a number of arms or robotic devices and other automatic pipette and sampling machines which can be used as a sampling means for removing the extension products from the PCR reaction at the appropriate times and transferring the sample for either chromatography, gel or capillary electrophoresis, mass spectrometry or other methods or techniques used to separate the samples. The analysis is determined by the type of separation. For example, a wavelength densitometer reader or a fluorescence reader is used depending on the label, if any, detected. A radioisotope detector is used for radioisotope labeled primers. In mass spectrometry, the ions are detected in the spectrometer. Alternatively, a gel is stained and read with a densitometer. The computer regulates the automated PCR amplification procedure, the sampling and removal from PCR, the automatic separation and reading of the samples and may also interpret the results and output the data.

The oligonucleotide primer defines a molecule comprised of more than three deoxyribonucleotides or oligonucleotides. Its exact length will depend on many factors relating to the ultimate function and use of the oligonucleotide primer, including temperature, source of the primer and use of the method. The oligonucleotide primer can occur naturally (as a purified fragment or restriction digestion product) or be produced synthetically. The oligonucleotide primer is capable of acting as an initiation point for synthesis, when placed under conditions which induce synthesis of a primer extension product complementary to a nucleic acid strand. The conditions include the presence of nucleotides and an inducing agent such as a DNA polymerase at a suitable temperature and pH. Sensitivity and specificity of the oligonucleotide primers are determined by the primer length and uniqueness of sequence within a given sample of a template DNA. Primers which are too short, for example, less than 10 mer may show non-specific binding to a wide variety of sequences in the genomic DNA and thus create a high background of non-specific bands. The oligonucleotide primers may be prepared using any suitable method known in the art. For example the phosphodiester, and phosphotriester methods or automated embodiments thereof. It is also possible to use a primer which has been isolated from biological sources such as with a restriction endonuclease digest.

Each primer pair is selected to be substantially complementary to the different strands of each specific repetitive sequence to which the primer pairs bind. Thus one primer of each pair is sufficiently complementary to hybridize with a part of the sequence in the sense strand and the other primer of each pair is sufficiently complementary to hybridize with a different part of the same repetitive sequence in the anti-sense strand. It should also be recognized that a single primer can be considered a primer pair. Because the primer binds to repetitive sequences and because the repetitive sequences can be orientated in both directions, a single primer can bind to both strands of a repetitive sequence and amplify the sequence between two separate repetitive sequences.

A primer pair that is outwardly directed refers to the oligonucleotide primers and the direction of their binding. For example, one primer is substantially complementary to the sense strand. This primer binds to the sense strand in such an orientation that the extension product generated from the 3' end of the primer extends away from the repetitive DNA sequence to which the oligonucleotide primer is bound and across the non-repetitive DNA to a second repetitive DNA sequence. The other member of the primer pair binds to the anti-sense strand. This primer binds in an orientation such that extension products generated on the 3' end extends away from the repetitive DNA sequence to which the primer is bound and across the non-repetitive DNA to the next repetitive DNA sequence. Thus, within a specific repetitive DNA sequence the primer pair is bound to the complementary DNA strands at the 5' end and, thus, the extension products grow away from each other across the non-repetitive DNA. The extension products from the two paired primers are complementary to each other and can serve as templates for further synthesis by binding the other member of the primer pair. A primer pair that is inwardly directed refers to the opposite scenario, such as the primer pair is bound to the complementary DNA strands at the 3' end.

The extension product is the nucleotide sequence which is synthesized in the presence of nucleotides and an inducing agent such as a polymerase from an end of the oligonucleotide primer and which is complementary to the strand to which the oligonucleotide primer is bound.

An extension product may be differentially labeled, which indicates that the extension product is distinguished from all the others because it has a different label attached or is of a different size or binds to a specific oligonucleotide or a combination thereof. One skilled in the art will recognize that a variety of labels are available. For example, these can include radioisotopes, fluorescers, chemiluminescers, enzymes and antibodies. Various factors affect the choice of the label. These include the effect of the label on the rate of hybridization and binding of the primer to the DNA, the sensitivity of the label, the ease in making the labeled primer, probe or extension products, the ability to automate, available instrumentation, convenience and the like. For example size alone is sufficient to distinguish the patterns and thus no label is needed. The size differences can be determined after staining the DNA, for example with ethidium bromide. However, when detecting multiple species in a sample or for multiple repetitive sequences, it may be advantageous to add a radioactive label such as $^{32}P$, $^{3}H$ or $^{14}C$; a different fluorescer such as fluorescein, tetramethylrhodamine, Texas Red, BODIPY® dyes, 4-chloro-7-nitrobenzo-2-oxa-1-diazole (NBD), or a mixture thereof.

The repetitive sequence to which the primers bind is selected from any of the repetitive regions that are found in the organism or composition of interest. The repetitive sequences can be identified by a variety of methods. This may be done manually by comparing the sequences of the published nucleic acid sequences for bacterial genomes. A more convenient method, however, is to use a computer program to compare the sequences and generate a consensus DNA sequence.

Any source of nucleic acid in purified or non-purified form can be utilized as starting material, provided it contains or is suspected of containing a genome of interest. Thus, the nucleic acids may be obtained from any source which includes the cell, tissue or organism. For example: (1) in horticulture and agricultural testing the sample can be a plant, fertilizer, soil, liquid or other horticultural or agricultural product; (2) in food testing the sample can be fresh food or processed food (for example infant formula, seafood, fresh produce and packaged food); (3) in environmental testing the sample can be liquid, soil, sewage treatment, sludge and any other sample in the environment which is considered or suspected of having a cell or a plurality of cells of the desired organism or composition.

If the sample is a mixture, it can be treated within an appropriate reagent which is effective to open the cells and expose or separate the strands of nucleic acids. Although not necessary, this lysing and nucleic acid denaturing step will allow amplification to occur more readily. Further, if desired, the organism or composition can be cultured prior to analysis and thus a pure sample obtained, however, this is not necessary.

The inducing agent for polymerization may be any compound or system which functions to accomplish the synthesis of primer extension products. Examples of inducing enzymes which have been used for this purpose include *E. coli* DNA polymerase I, Klenow fragment of *E. coli* DNA polymerase I, T4 DNA polymerase, Taq DNA polymerase, Vent DNA polymerase and other available DNA polymerases.

The extension products may be identified by separation of the products by size using any number of techniques and methods known in the art. Examples include, but are not limited to, gel electrophoresis, capillary electrophoresis, chromatography, pulsed field gel electrophoresis and mass spectrometry. The choice of method depends on a number of factors, such as the available laboratory equipment, the amount of extension product present, the label if any, the dye, the preference of the party performing the testing, convenience and the like. Capillary electrophoresis allows the rapid separation of DNA fragments through tiny polyacrylamide gels in thin capillaries. The chief advantage is that much larger voltages can be applied and resolution is enhanced. The process may be automated. Once tubes are loaded, electrophoresis and data acquisition can be automated by direct connection to computer. An example includes the Model 270A-HT High Throughput Capillary Electrophoresis System (Applied Biosystems). Instead of bands on a gel, the DNA fragments are represented by spikes as a function of time indicating the presence of different molecules of different sizes. Another advantage is that not only can PCR-generated spike patterns be quickly obtained with greater resolution of different-sized fragments, but intensity of different bands could be accurately quantitated; permitting even greater resolution.

Non-electrophoresis methods, namely chromatography, may be used to separate PCR-generated DNA fragments by size. High-Performance Liquid Chromatography ("HPLC") methods may be used to separate DNA fragments by the use of size-exclusion columns (Series 800 HRLC Gradient System-BioRad). DNA fragments are represented by spikes as a function of time and the data is digitized and fed directly to a computer. Electrophoresis methods, however, are usually preferred because of greater reliability and resolution.

One skilled in the art will recognize that measurement of the pattern of sized extension products to determine the specific organism or composition present may also be accomplished by several means, including direct visualization or by automation using a bar code reader, a laser reader, digitizer, a photometer, a fluorescence reader or computer planimetry. The choice of measurement method depends in part on the separation step and available instrumentation.

Alternatively, a plurality of pairs of primers can be added to the amplification reaction. Each pair of primers binds a different repetitive sequence. Further, the multi-primer assay can be enhanced by differentially labeling the primer pairs. Thus, after amplification, not only is the sized pattern examined, but also the size pattern for each label is examined.

EXAMPLES

Example 1

Method of Preparing the Bioremediation System

A composition of the present invention was prepared by first dechlorinating water. The dechlorination procedure involved mixing about one ounce of sodium sulfite into about 1 quart of water. An aliquot of 1 fluid ounce (approximately 30 g by weight) was diluted in about 5 gallons of water to provide water having less than about 2 ppm chlorine. The media was prepared by first placing aeration stones in a container having 5 gallons of the prepared water having less than about 2 ppm chlorine and testing the pH and amount of dissolved oxygen.

A nutrient source was used that had about 30% nitrogen, about 10% phosphorous, about 10% potassium and trace amounts of micronutrients including iron, boron, manganese, zinc, molybdenum, and copper. A dry yeast was added to the solution followed by a commercial digest such as DIGESTASE APD 900 (Athea Product Inc.).

This solution was then incubated for about 36 to about 48 hours to allow the microbes to reproduce at a temperature in the range of about 20° C. to about 37° C. The solution was maintained during this time by adding amounts of water having less than about 2 ppm water to maintain the initial volume. Concomitantly, additional nutrients and dry yeast were also added to maintain the microbes in an environment that is similar to the initial media. This process provides a first generation liquid bioremediation system.

A second generation is prepared by subjecting an amount of the first generation bioremediation system to a second processing cycle. This is achieved by adding a volume to the media to replace the starter bacteria, the yeast, or the starter bacteria and the yeast.

For a solid bioremediation system, a volume in the amount of about 1 to 1.5 parts (1 to 1.5 gallons) of the above-prepared first generation liquid composition was mixed with white corn meal, wheat bran or rice bran provided in the amount of about 25 pounds. After mixing, the solid composition was applied in thin layers to sheer fabric and dried completely, which took about 48 hours. In some cases, the ambient temperature was increased and/or the humidity was decreased to facilitate drying.

Preparing a second generation solid bioremediation system involves adding a starch to a volume of the second generation liquid bioremediation system in an amount that provides a ratio about equal to 1 volume per 25 pounds of starch. Alternatively, the ratio is about equal to 1.5 volumes per 25 pounds of starch.

Example 2

Characterization of the Bioremediation System by DNA Fingerprinting

To characterize the inventive composition, five samples were processed by DNA fingerprinting: Original Dry, Plain Cornmeal, APD Liquid Sludge, Dry APD Other, APD 46 hr Dry. The four dry samples were reconstituted. The 'Original Dry' sample is the starter bacteria used in the formulation and represents an unprocessed composition; 'Plain Cornmeal' is a sample of the cornmeal added to the liquid system; 'APD Liquid Sludge' is the bioremediation system before addition of the cornmeal, and the "APD" in the name indicates that all-purpose digest served as the starter bacteria; 'Dry APD Other' and 'APD 46 hr Dry' are two independent solid bioremediation systems that were processed similarly and represent duplicate samples. The bacterial DNA was extracted using the Ultra Clean DNA Extraction Kit from MoBio (Carlsbad, Calif.). From each of the three samples, 100 ng of DNA was amplified using the rep-PRO rep-PCR DNA Fingerprinting Kit (Bacterial BarCodes, Inc., Houston, Tex.) in duplicate.

Figure 2:
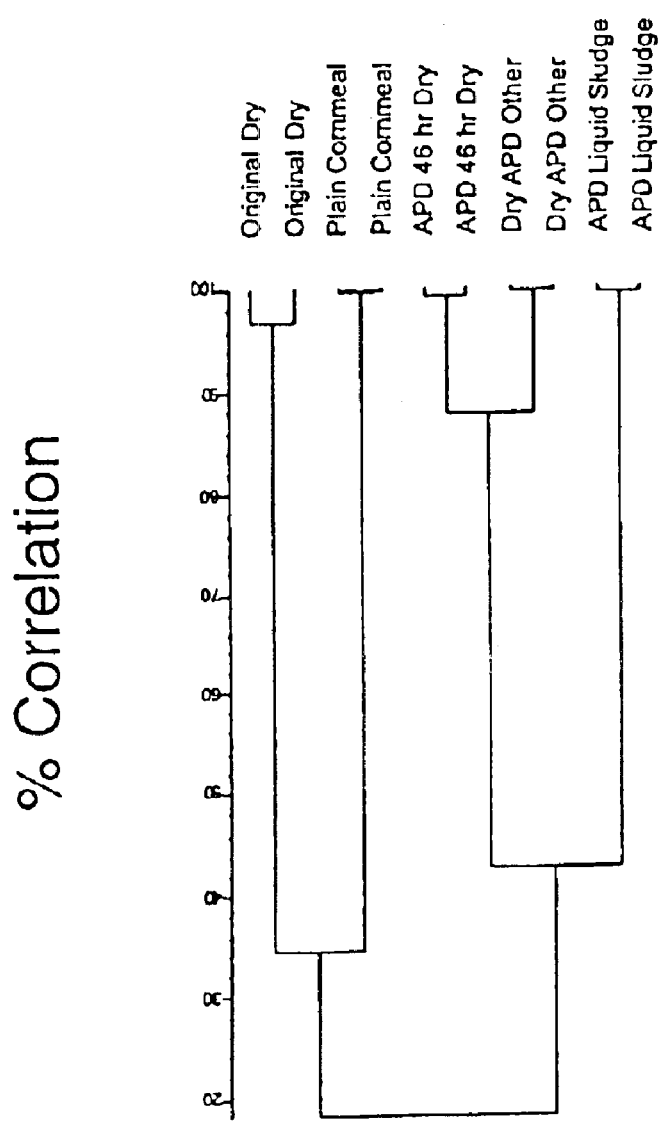
FIG. 2 is a dendrogram generated using the Pearson correlation based on sequence identity.
Figure 3:
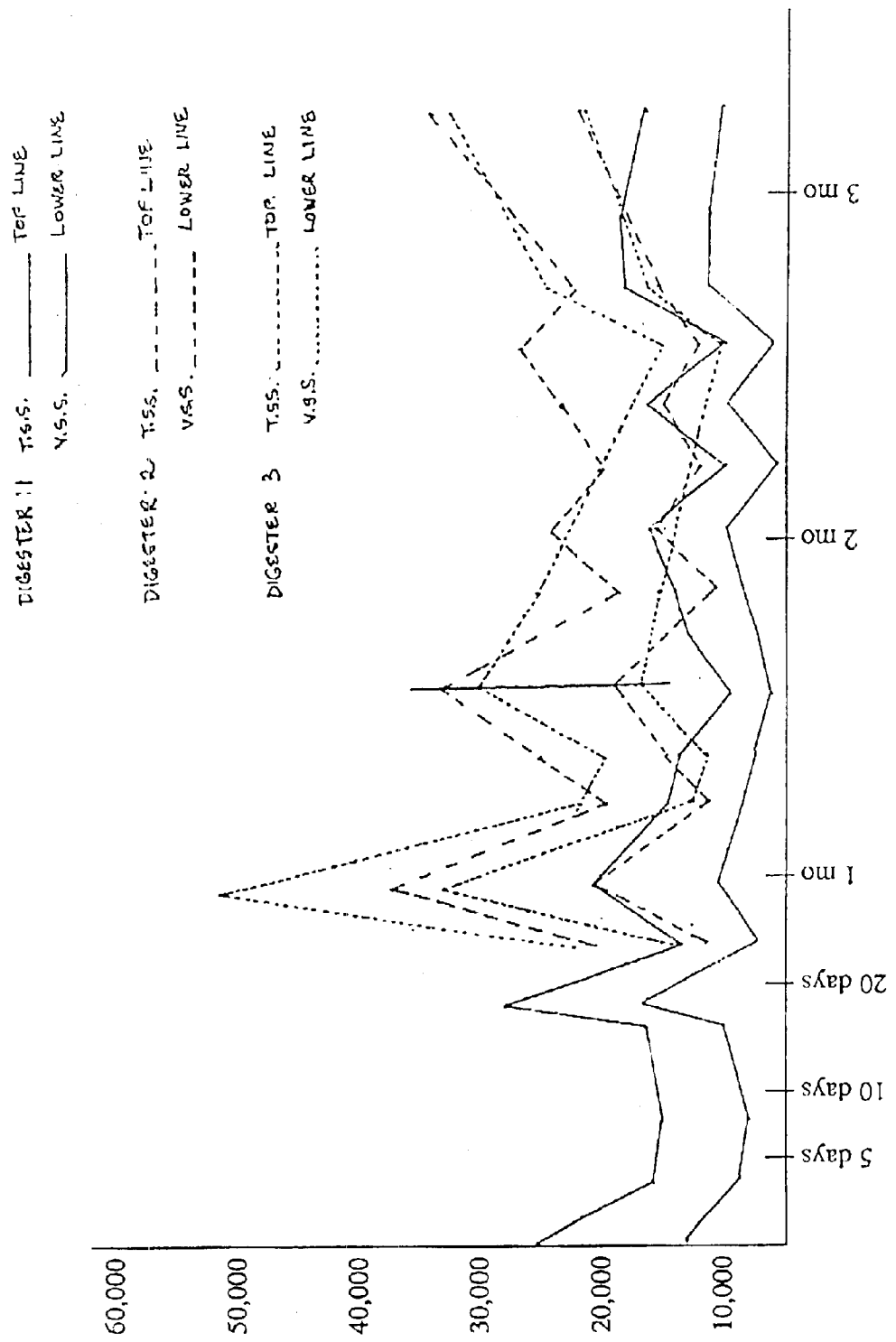
FIG. 3 is a graph indicating the TSS and VSS measurements of a digester treated with bioremediation system relative to a control digester.

The gel image shows the DNA fingerprint patterns (FIG. 1). Bionumerics software package was used to analyze the DNA fingerprint patterns and create the dendrogram, which employed the Pearson correlation (FIG. 2). Within sample duplicates there is a correlation of >96% similarity, indicating that these samples are indistinguishable. The similarity between the APD 46 hr DRY and the Dry APD Other is 87%, indicating that these samples are similar. The Original Dry, Plain Cornmeal, and APD Liquid Sludge, show such low similarity, they are not comparable. In this sample set a similar signature banding pattern can be seen in both the APD 46 hr DRY and the Dry APD Other (3437 bp, 991 bp and 676 bp). These samples also share signature bands with APD Liquid Sludge (3189 bp and 1737 bp). The set of signature bands are not seen in the Original Dry nor the Plain Cornmeal. This signature banding pattern is used to identify the APD (46 hr Dry and Dry Other) from the other samples.

Example 3

Characterization of the Bioremediation System by Spectroscopy

Spectroscopic characterization was performed on the 'APD 46 hr Dry' sample (referred to as "sample" for purposes of this section) and the 'Original Dry' (referred to as "control" for purposes of this section). The spectroscopic analysis included $^{31}$P-MAS, $^{1}$H-$^{31}$P CPMAS, $^{1}$H-$^{31}$C CPMAS, and MS. All NMR analyses were taken on a Bruker Avance200 spectrometer in the solid state so as not to introduce solvent effects. $^{31}$P-NMR spectra were recorded at 5 kHz spinning speed, 3.2 µsec and 90 degree $^{31}$P pulse, 41 msec FID with proton decoupling, a 10 sec relaxation delay and referenced to solid $NH_4H_2PO_4$. The $^{1}$H-$^{31}$C CPMAS spectra were collected at 6.9 kHz spinning speed and referenced to the carbonyl carbon of glycine, defined as 176.2 ppm. Mass spectra (MS) (EI, 70 eV), were obtained by heating the material to greater than about 600° C. in the ion source of a MAT95 spectrometer using a high temperature direct insertion probe.

Figure 5:
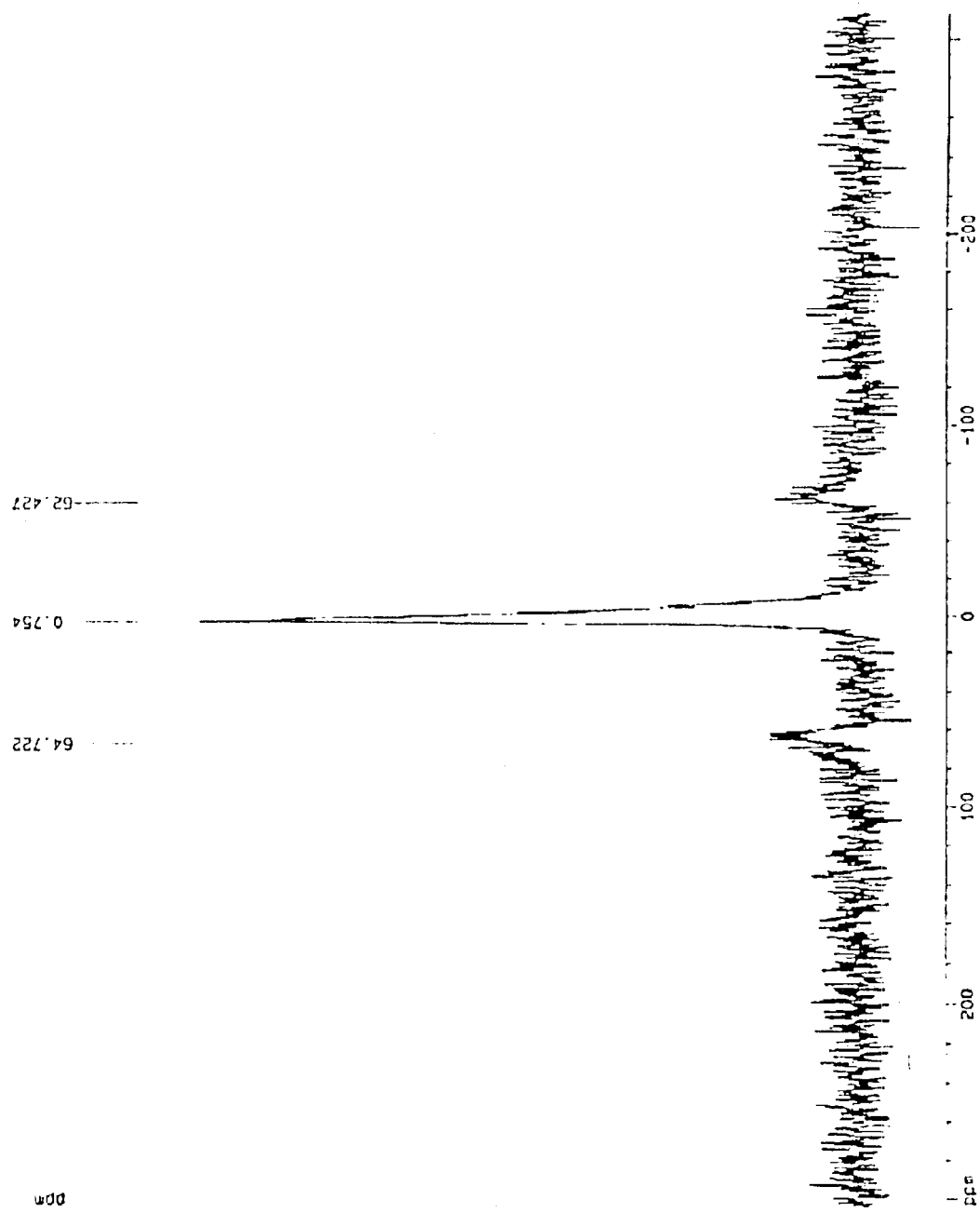
FIG. 5 shows the $^{31}P$ NMR spectrum of a processed composition of the present invention.
Figure 6:
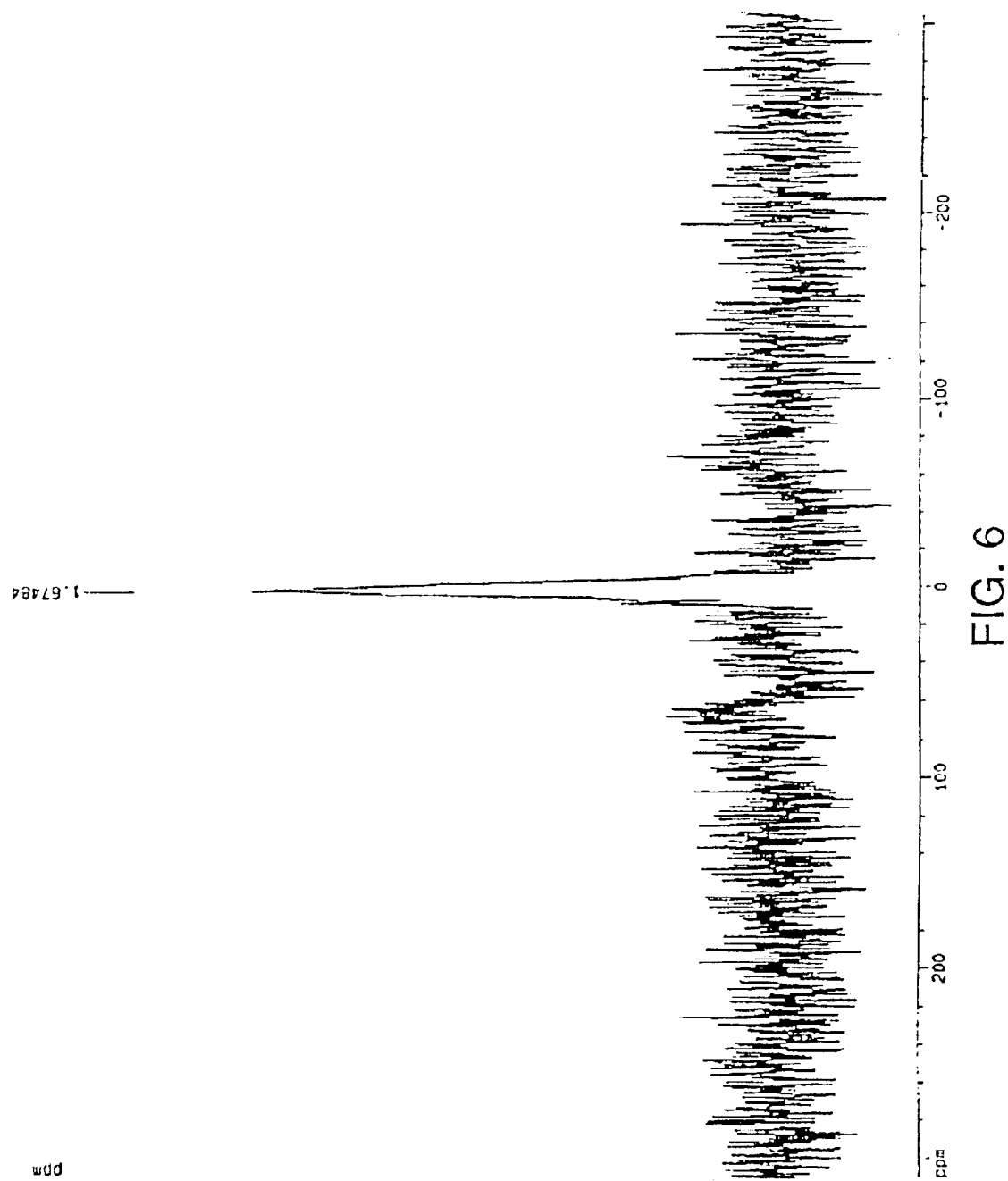
FIG. 6 shows the $^{31}P$ NMR spectrum of an unprocessed composition.

NMR: The $^{31}$P-NMR analysis indicated that phosphorous was present in both the sample and the control. FIGS. 5 and 6 show the $^{31}$P-NMR spectra taken of the sample (FIG. 5) and the control (FIG. 6). The phosphorous peak in the sample is at about 0.754 ppm, and the phosphorous peak in the control is at about 1.675 ppm.

Figure 7:
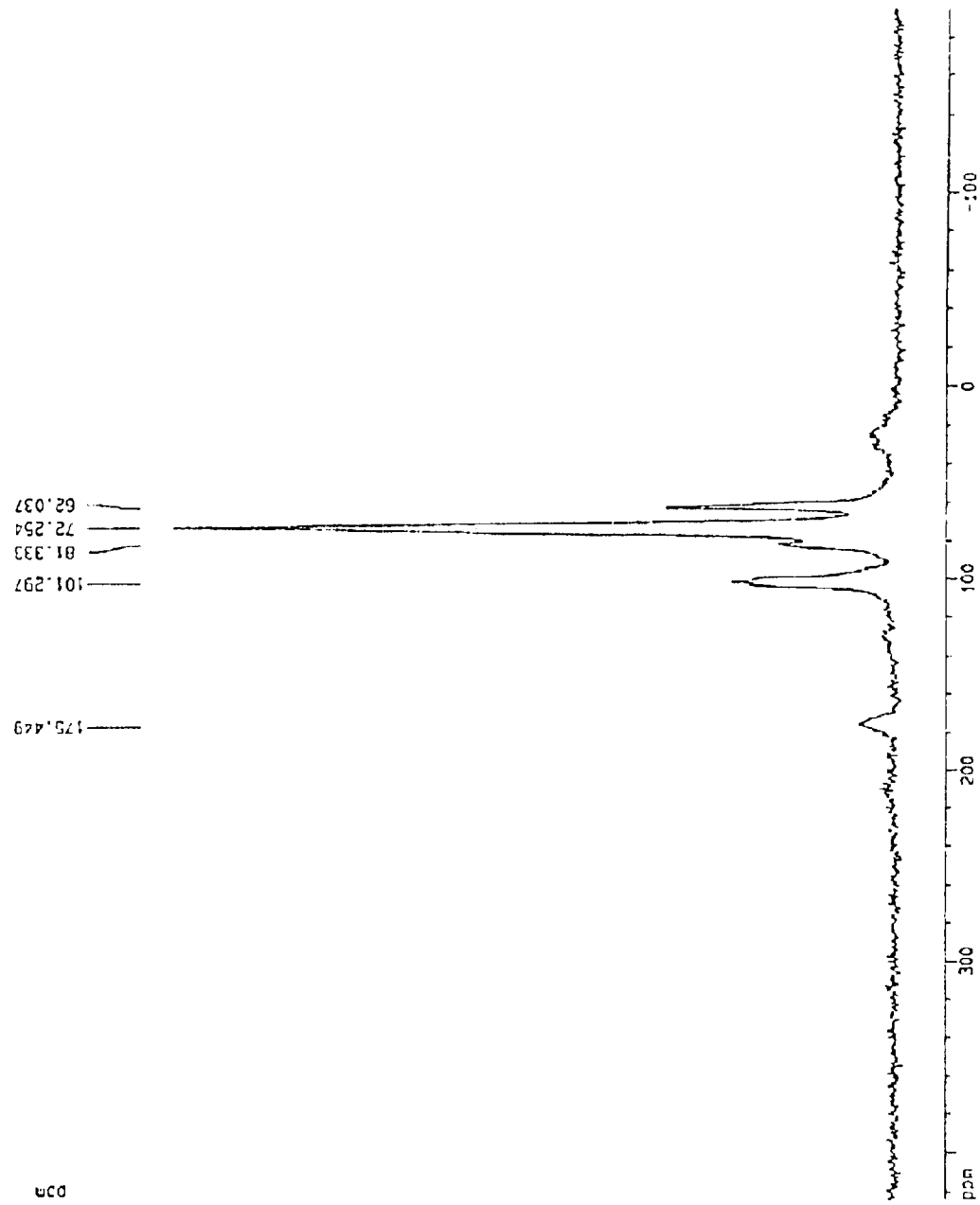
FIG. 7 shows the $^{1}H$-$^{31}C$ NMR spectrum of a processed composition of the present invention.
Figure 8:
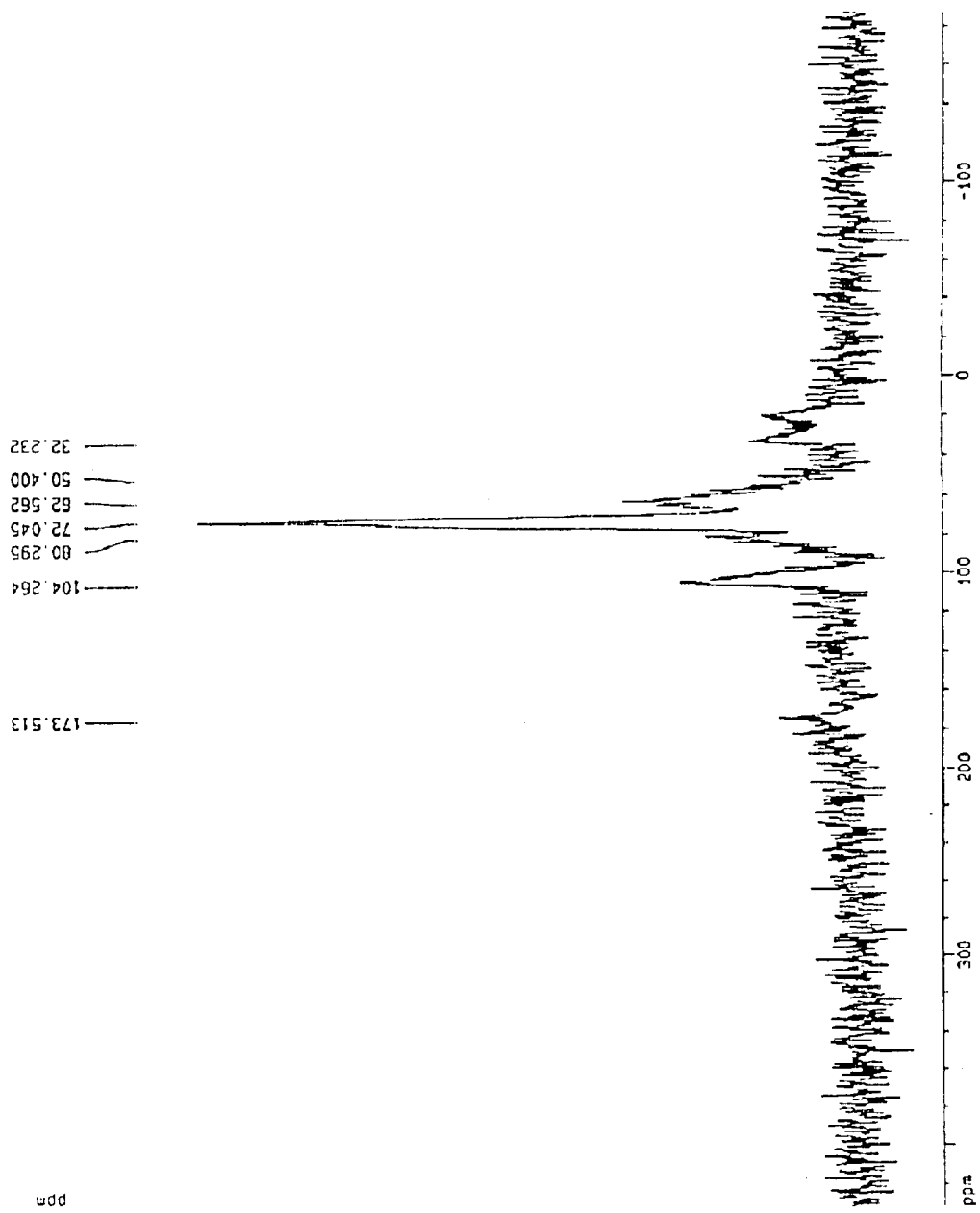
FIG. 8 shows the $^{1}H$-$^{31}C$ NMR spectrum of an unprocessed composition.

The $^{1}$H-$^{31}$C CPMAS analysis indicated that the sample spectrum was dominated by O—C(sp$^3$) signals. The signal observed near 100 ppm is consistent with anomeric carbon of carbohydrates and is uncommon in $^{31}$C NMR. The cluster of signals from about 60–80 ppm is not as unusual, and by themselves indicate O—C(sp$^3$) functionality. The signal near 175 ppm and the very weak sp$^2$ carbon signal intensity near 130 ppm indicate a carbonyl or an imino signal. Weak aliphatic carbon bands (i.e., not bonded to oxygen) were observed from about 15–40 ppm. FIG. 7 shows the $^{1}$H-$^{31}$C CPMAS spectra of the sample. The same analysis of the control provided a qualitatively similar spectra, shown in FIG. 8, however, the signal-to-noise is much lower than the sample.

Figure 9:
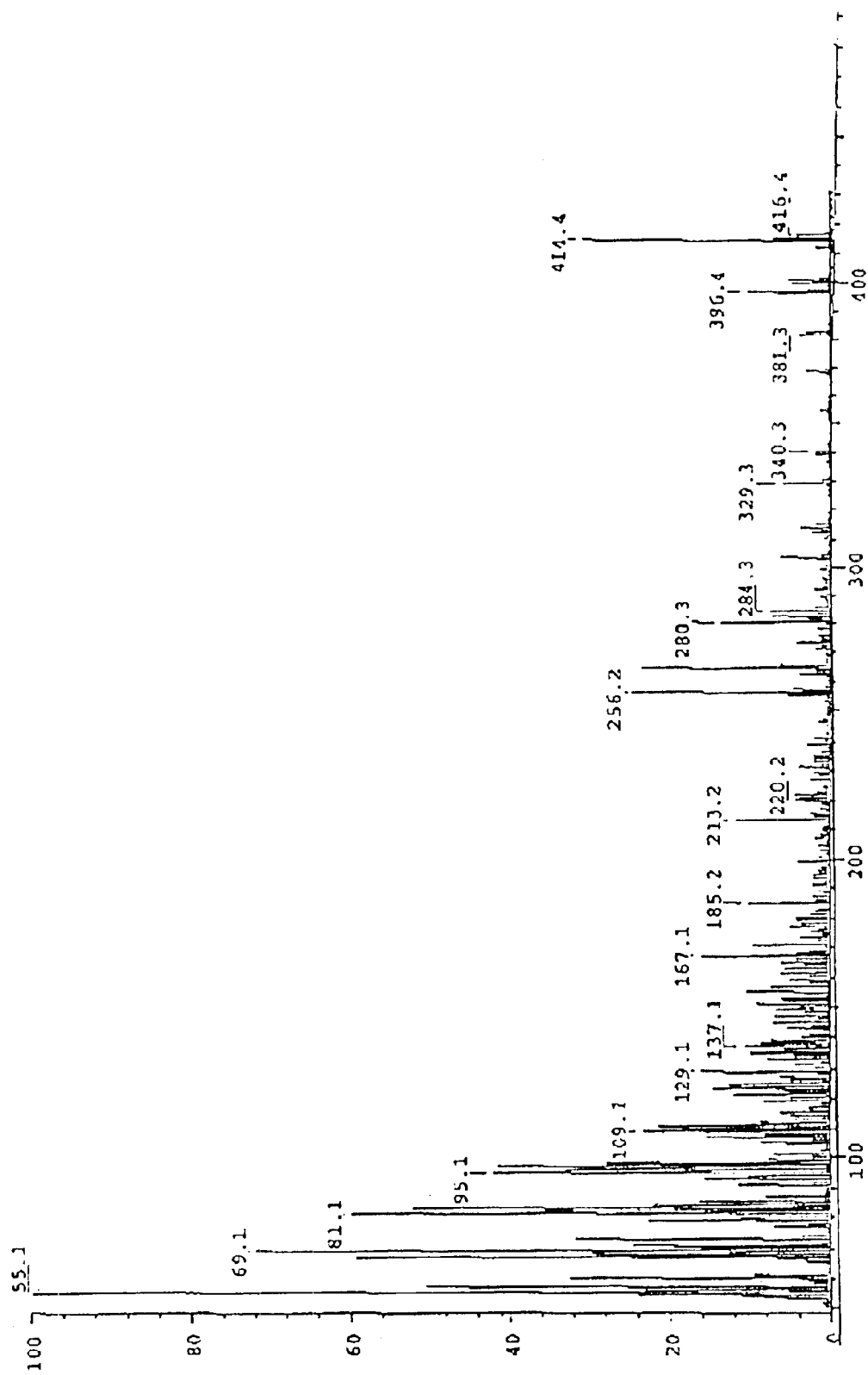
FIG. 9 shows the MS spectrum of a processed composition of the present invention.
Figure 10:
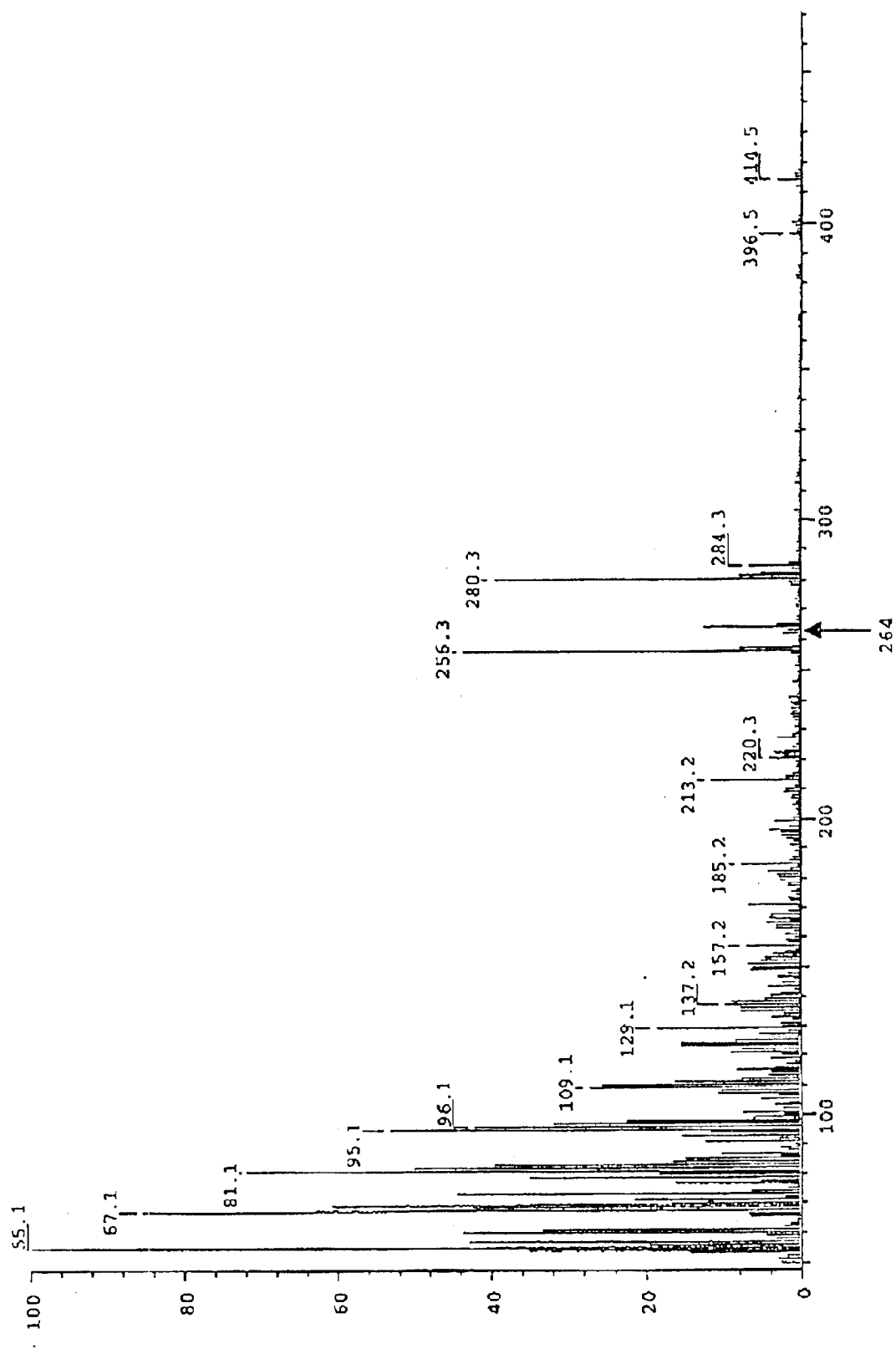
FIG. 10 shows the MS spectrum of an unprocessed composition.

MS: The control demonstrated difficulty in volatilizing and left behind a carbon residue as compared to the sample, which volatilized readily and did not carbonize. The sample exhibited different relative amounts of components as compared to the control, thereby indicating a different composition in the sample. FIG. 9 is the mass spectrum obtained from the sample after 45 scans. FIG. 10 is the mass spectrum obtained from the control after 33 scans, which has approximately the same m/e range as is shown in the sample spectrum. The intensity of several signals were enhanced in the sample as compared to the control. For purposes of comparison and because the amounts analyzed were not equal, the maximum intensity of the mass value m/e 262, 264, 338, 396, 414 and 602 signals were normalized to the maximum intensity of the mass value m/e equal to 256, which was determined to be an intense peak in both spectra. The results are given in Table 3.

TABLE 3

Relative Ratios of Mass Values

| | Sample | | Control | |
|---|---|---|---|---|
| Mass (m/e) | Max Ion Current (x1000) | Normal to m/e 256 (%) | Max Ion Current (x1000) | Normal to m/e 256 |
| 256 | 180.00 | 100 | 1500.00 | 100 |
| 262 | 43.00 | 23.9 | 65.00 | 4.3 |
| 264 | 120.00 | 66.7 | 390.00 | 26.0 |
| 338 | 29.00 | 16.1 | 26.00 | 1.7 |
| 396 | 27.00 | 15.0 | 40.00 | 2.7 |
| 414 | 69.00 | 38.3 | 87.00 | 5.8 |
| 602 | 7.50 | 4.2 | 1.60 | 0.1 |

Analyzing the empirically determined relative ratios indicate that each of the mass values are in the sample as compared to the control.

Example 4

Treatment of Sewage Digester

A sewage plant in Jefferson Parish, La. was selected as a site for experimental observation. The plant had three digesters: Digesters 1 and 2 were of approximately the same size and holding capacity, and Digester 3 was double the size and holding capacity as compared to Digesters 1 and 2. Each day, approximately 14 million gallons of sewage was brought to the plant and added to each digester in the approximate amounts of 25% to Digester 1, 25% to Digester 2, and 50% Digester 3. Samples were removed for analysis about every 5 days. Samples from Digesters 2 and 3 were removed for comparison beginning at 20 days post-treatment.

Digester 1 was treated with the a first generation culture liquid of the microbial bioremediation system prepared as described in Example 1. Samples were taken from Digester 2 and analyzed after supernatant from Digester 1 was added. Digester 3 remained untreated. Dissolved oxygen (D.O.) was determined for all samples to monitor the effect of oxygen availability on the efficiency of the microbes in the bioremediation system.

Example 3

Reduction in Solid Matter Over 5 Days

The total suspended solids ("TSS") and volatile suspended solids ("VSS") were determined at the initial time of treatment and subsequent time points (referred to as "post-treatment") to monitor the effect that the microbial bioremediation system had on sewage matter in a sewage digester. The amounts dissolved oxygen were equal to or greater than 1.2 in all samples tested. Digester 1 was treated once, and at the time of treatment, the amount of TSS was 25,400 mg/L and the amount of VSS was 13,440 mg/L (see Table 1). At 5 days post-treatment, the amount of TSS decreased by about 36% and the amount of VSS decreased by about 30%. Subsequent measurements, taken in the following 18 days, indicated that the TSS amount remained about 34% to about 40% lower than the TSS value before treatment. Similarly, the VSS amount remained about 23% to about 36% lower than the VSS value before treatment. At no time was matter (i.e., sludge) removed from Digester 1.

This unexpected result indicated that the microbial bioremediation system was remediating the sewage matter and sludge present in the initial volume of the sewage as well as amounts of sludge present in the volume of sewage added each day (approximately 3.5 million gallons). Despite adding the sewage matter, it was not necessary to remove sludge from Digester 1 unlike conventional sewage treatment which requires the removal of sludge to prevent its accumulation. The ability of the inventive microbial bioremediation system to remediate sewage matter and sludge in the total amount of about 17.5 million gallons within 5 days is a significant advantage over conventional sewage treatment systems. Further, the digester that was treated with the bioremediation system did not require sludge removal because biomass was not accumulating as a consequence of the treatment, thereby affording significant economic and environmental advantages over conventional sewage treatment systems.

Example 5

Reduction in Solid Matter Compared to Control Digester

At 20 days post-treatment, the supernatant (i.e., water) that was generated from the remediation of the sewage matter in Digester 1 was added to Digester 2. At this time, samples from the untreated, control digester, Digester 3, were also periodically evaluated. The TSS and VSS amounts were determined to provide a reference to compare for evaluation of Digester 1 (Table 2). Samples were removed on the specified dates and analyzed for dissolved oxygen, TSS and VSS. Dissolved oxygen was equal to or greater than 1.2 in all samples tested from Digester 1 and equal to or greater than 1.1 in all samples tested from Digester 3.

To compare the data collected between Digester 1 and Digester 3, the degree of change (% change) from the initial measurement was calculated. A positive number indicates a decrease in the component, and a negative number indicates an increase in the component. The fluctuations between measurements are due to dependent factors that occur in the field including environmental influences such as rainfall, temperature and humidity and the nature of the sewage transferred to the digesters each day. To accommodate these influences, the data collected on the same dates are compared to establish the improvement of treating with the microbial bioremediation system, represented in Digester 1, relative to conventional digestion, represented in Digester 3. Through the course of the experiment, Digester 3 required continuous removal of accumulating sludge, as is common for conventional sewage treatment systems. However,

TABLE 1

Reduction in Solid Matter

| Measurement | Initial | 5 d post-treatment | 10 d post-treatment | 18 d post-treatment | 20 d post-treatment | 25 d post-treatment |
|---|---|---|---|---|---|---|
| TSS (mg/L) | 25,4000 | 16,240 | 15,320 | 16,700 | 27,680 | 13,360 |
| % TSS Change from initial | n/a | 36.1 | 39.7 | 34.2 | −9.0 | 47.4 |
| VSS (mg/L) | 13,440 | 9,360 | 8,600 | 10,350 | 16,640 | 7,720 |
| % VSS Change from initial | n/a | 30.4 | 36.0 | 23.0 | −23.8 | 42.6 |

Example 4

Indication of Illegal Components in Sewage

At 20 days post-treatment, the TSS and VSS amounts sharply increased. The amounts of TSS and VSS increased about 9% and 24%, respectively, relative to the initial amounts (Table 1). It was determined and confirmed that the sharp increase in both measurements indicated the presence of illegal components in a lift station which fed into the sewage plant. Further, the intensity of the increase was correlated with concentration of the illegal components and allowed identification of a nearby site of illegal dumping into local sewage systems. Despite the presence of a pollutant in the sewage, the composition of the present invention did not display problems associated with survival and propagation, which are often exacerbated by the presence of toxic pollutants, as evidenced by the regained reduction in TSS and in VSS amounts relative to the initial amounts at 25 days post-treatment.

removal of neither sludge or biomass was required for Digester 1 during the three month investigation, but rather the water generated from the bioremediation treatment was redelivered periodically to other parts of the sewage treatment system and, eventually, was disinfected and discharged.

In general, Digester 1 demonstrated a more consistent decrease in both TSS and VSS as compared to Digester 3. In other words, the amounts of TSS and/or VSS in Digester 1 were consistently less than the amounts in Digester 3 measured on the same days. Directly comparing the percent change at one month post-treatment (sample from 09/10), the TSS amount in Digester 1 was reduced approximately 148% (19.5−(−128.9)) and the VSS amount was reduced approximately 160% (18.7−(−141.6)) relative to the TSS and VSS amounts in Digester 3. Direct comparison of the percent change between Digester 1 and the control up to more than three months post-treatment indicated that the TSS amount was reduced by no less than 15% and the VSS amount was reduced by no less than about 9% (see data for 11.5 wks post-treatment). Importantly, the reduction amounts that are calculated from direct comparisons do not reflect that Digester 3 required continuous removal of sludge and that Digester 1 required no removal of sludge or biomass at any time. Thus, it is reasonable to state that the TSS reduction is no less than 115% and the VSS reduction is no less than 109% as compared to conventional sewage treatment.

Because of the fluctuations observed between measurements, averages were calculated for each sample set. At one to 1.5 months post-treatment, the percent change in TSS and VSS relative to the initial values measured (n=2) were calculated for both Digester 1 and Digester 3 Comparing these average values indicated that Digester 1 demonstrated an approximate 94% reduction in TSS and VSS as compared to the measurements taken in the same time frame from Digester 3. Repeating this simple calculation for any two consecutive measurements indicated that the TSS amounts reduced from about 26% to about 94% in Digester 1 as compared to Digester 3, and the VSS amounts reduced from about 22% to about 94% in Digester 1 as compared to Digester 3. Averaging three consecutive measurements (n=3) indicated that the TSS amounts reduced from about 20% to about 17% and the VSS amounts reduced from about 33% to about 65% in Digester 1 as compared to Digester 3 in the same time frames.

Figure 4:
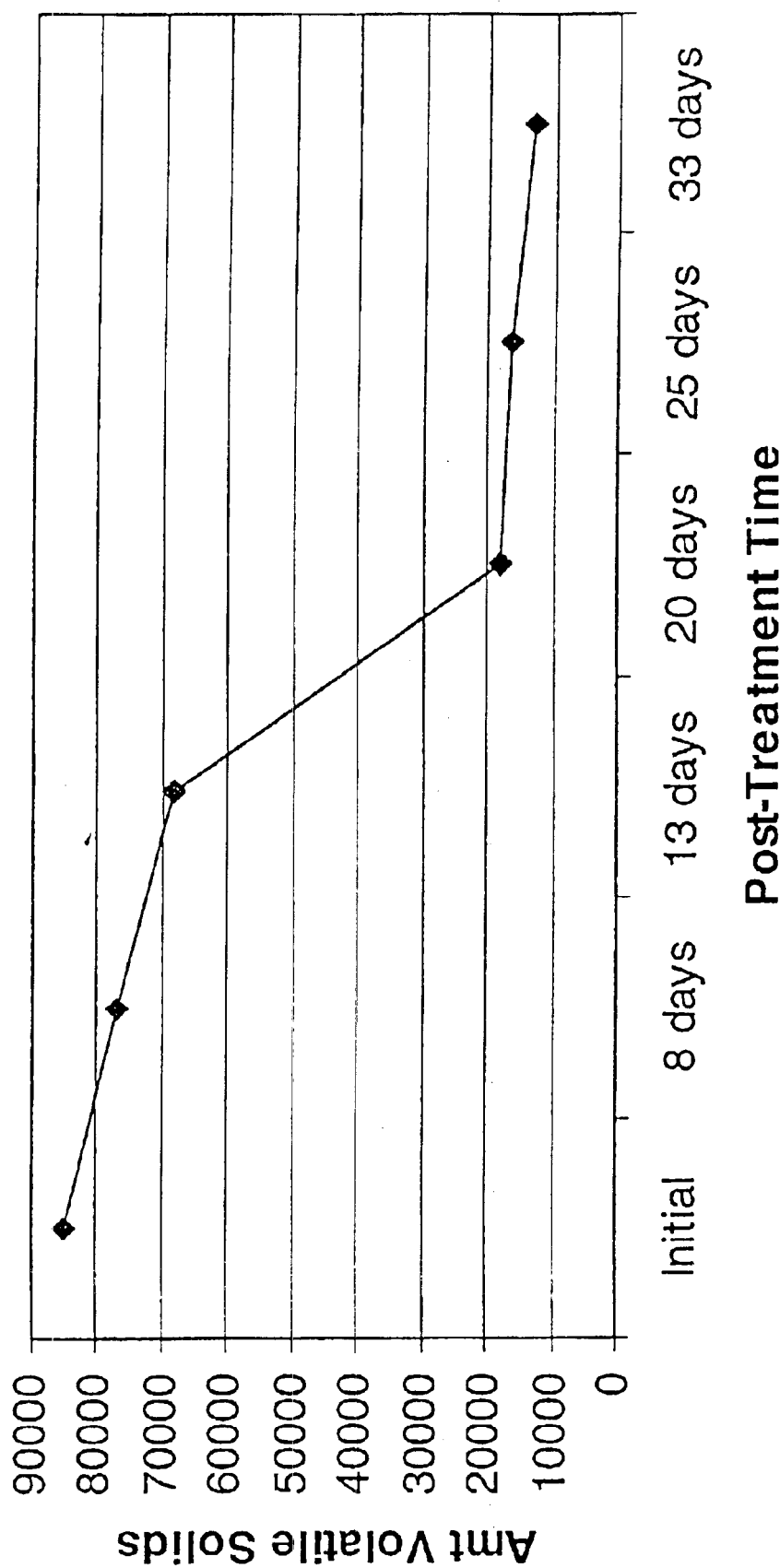
FIG. 4 is a graph indicating the VSS measurements of a sewage plant treated with the bioremediation system.

Treatment of Digester 2 with the supernatant of Digester 1 (i.e., water generated from treating the sewage with the composition of the present invention) indicated a reduction in TSS of about 50% and a reduction in VSS of about 68% at five days post-treatment, however, greater fluctuations in the data were observed over time.

bioremediation system and monitored for six weeks. This plant does not have a primary digester in-line, and, thus, the sludge and the bioremediation system is not subjected initially to an anaerobic environment. Samples of aqueous surface water were removed weekly and analyzed for volatile solids (mg/L) (see, FIG. 4). Analysis at eight days post-treatment indicated about a 9% VSS reduction had occurred. After 15 days post-treatment, the supernatant from the digester (i.e., aqueous volume generated from treatment with the bioremediation system) was redelivered to other parts of the plant and, eventually, was disinfected and discharged. Again, neither sludge nor biomass was removed from the system. The significance of the redelivery of the supernatant is observed in the amount of volatile solids that was determined after its occurrence, which yielded a reduction of about 79% at 20 days post-treatment, and was maintained for the remaining duration of the study. Thus, the bioremediation system of the present invention functions to degrade substantial volumes of sewage, sludge and odor-causing matter for long periods of time, and furthermore, the by-products generated from its application are environmentally innocuous.

References

Patents
U.S. application 2002/0020664 to Tartakovsky, et al, published Feb. 21, 2002
U.S. Pat. No. 6,204,049 to Bennett, et al. Mar. 20, 2001
U.S. Pat. No. 4,668,512 to Lewis et al.
U.S. Pat. No. 6,165,356 Carman, et al. Dec. 26, 2000
U.S. Pat. No. 6,036,852 Carman, et al. Mar. 14, 2000
U.S. Pat. No. 6,087,155 York, et al. Jul. 11, 2000

TABLE 2

Reduction in Solid Matter as Compared to Control

Time from Post-Treatment of Digester 1

|  | Initial | 25 d | 1 mo. (4 wks) | 5 wks | 6 wks | 6.5 wks | 7.5 wks | 10 wks | 11 wks | 11.5 wks | 12.5 wks |
| --- | --- | --- | --- | --- | --- | --- | --- | --- | --- | --- | --- |
| Digester 1 | | | | | | | | | | | |
| TSS (mg/L) | 25,400 | 13,360 | 20,440 | 14,800 | 13,560 | 9,880 | 13,640 | 9,440 | 17,200 | 17,920 | 15,840 |
| % TSS Change | n/a | 47.4 | 19.5 | 41.7 | 46.6 | 61.1 | 46.3 | 62.8 | 32.3 | 29.4 | 37.6 |
| VSS (mg/L) | 13,440 | 7,720 | 10,920 | 8,520 | 7,720 | 6,040 | 8,120 | 5,520 | 10,960 | 10,800 | 9,720 |
| % VSS Change | n/a | 42.6 | 18.8 | 36.6 | 42.6 | 55.0 | 39.6 | 58.9 | 18.4 | 19.6 | 27.7 |
| Digester 3 (Control) | | | | | | | | | | | |
| TSS (mg/L) | n/a | 22,000 | 50,360 | 21,800 | 19,640 | 29,720 | 24,800 | 14,360 | 23,120 | 18,840 | 31,080 |
| % TSS Change | n/a | n/a | −128.9 | 0.9 | 10.7 | −35.1 | −12.7 | 34.7 | −5.1 | 14.4 | −41.3 |
| VSS (mg/L) | n/a | 13,360 | 32,280 | 12,440 | 11,280 | 16,640 | 14,960 | 9,800 | 15,520 | 11,920 | 20,520 |
| % VSS Change | n/a | n/a | −141.6 | 6.9 | 15.6 | −24.6 | −12.0 | 26.7 | −16.2 | 10.8 | −53.6 |

The "% TSS change" and "% VSS Change" are determined by calculating the amount measured at a time point relative to the initial amount, which yields a negative number if the amount measured at a time point is higher than the initial amount measured.

Example 6

Sludge Treatment-Second Plant Experiment

A test plant having a 250,000 gallon holding capacity was treated with the a first generation microbial culture of the U.S. Pat. No. 5,811,290 to Varadaraj, et al. Sep. 22, 1998
U.S. Pat. No. 5,705,690, to Varadaraj, et al.
U.S. Pat. No. 6,254,776 to Seagle Jul. 3, 2001
U.S. Pat. No. 5,691,136; Lupski et al., Nov. 25, 1997
U.S. Pat. No. 4,683,195 to Mullis, Jul. 28, 1987
U.S. Pat. No. 4,683,202 to Mullis, July 28, 1987.

Non-patented Literature
Alexander, Advances in Applied Microbiology 7: 35–80 (1965) G. Chaudry (Ed.) "Biological degradation & bioremediation of toxic chemicals," Dioscorides Press, Portland, Oreg., 1984.

Ausubel et al., 1994, Current Protocols in Molecular Biology, Chapter 13.

Burke et al., 2000, Methods in Yeast Genetics, 2000 Edition: A Cold Spring Harbor Laboratory Course Manual.

D. W. Connell, & G. J. Miller, (1984) "Chemistry & Ecotoxicology of Pollution," pp. 1–48 & 231–247, John Wiley & Sons, Inc., New York, N.Y.

J. D. van Elsas, & C. E. Heijnen, "Methods for the introduction of bacteria into the soil: A review," Biol. Fertil. Soils, 10:127–133, 1990.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to included within their scope such processes, machines, manufacture, compositions of matter, means, methods, or steps.

What is claimed is:

1. A microbial mixture composition characterized by having DNA signature bands at about 3189 base pairs and at about 1737 base pairs.

2. The composition of claim 1, further comprising having DNA signature bands at about 3437 base pairs, at about 991 base pairs and at about 676 base pairs.

3. The composition of claim 1, further comprising the mixture characterized by having about 23% relative ratio of m/e equal to 264 and about 38% relative ratio of m/e equal to 414.

4. The microbial mixture composition of claim 1, comprising a prokaryote, a yeast or mixtures thereof.

5. A bioremediation system produced by a process comprising the steps of preparing a predetermined volume of a media having (i) less than about 2 ppm chlorine, (ii) a pH in the range of about 6.0 to about 9.0, (iii) a nutrient source having about 30% nitrogen, about 10% phosphate, and about 10% potassium, (iv) an enzyme and (v) a yeast cell; adding a starter bacteria, wherein the starter bacteria comprises at least one cell of an anaerobic bacteria and at least one cell of an aerobic bacteria; and incubating for at least about 36 hours at a temperature in the range of about 20° C. to about 37° C. to provide a liquid bioremediation system.

6. The product according to claim 5, wherein *Bacillus* sp. is the anaerobic bacteria, the aerobic bacteria, or both the anaerobic and the aerobic bacteria.

7. The product of claim 5, wherein the enzyme digests a carbohydrate, a protein, a lipid, or a surfactant.

8. The product of claim 5, wherein the yeast is a *Saccharomyces* sp.

9. The product of claim 5, further comprising adding elements selected from the group consisting of iron, boron, manganese, zinc, molybdenum, copper, or combinations thereof.

10. The product of claim 5, further comprising maintaining the predetermined volume by adding water having less than 2 ppm chlorine.

11. The product of claim 5, further comprising maintaining the phosphorous, nitrogen and potassium compositions.

12. The product of claim 5, further comprising the step of adding to the liquid bioremediation system a starch selected from the group consisting of corn meal, wheat bran, rice bran, or other cellulosic material to form a solid.

13. A method of operating a sewage treatment system comprising treating sewage with a microbial composition according to claim 1 for a time sufficient to reduce an amount of solid matter in the sewage without removing mass from the sewage treatment system.

14. The method of claim 13, wherein the solid matter is reduced by about 100% relative to the initial amount of solid matter.

15. The method of claim 13, wherein the solid matter comprises total suspended solids or volatile suspended solids.

16. The method of claim 15, wherein the total suspended solids is reduced by about 36% in about five days.

17. The method of claim 15, wherein the total suspended solids is reduced by an amount in the range of about 34% to about 40% over a period of time up to about 18 days.

18. The method of claim 15, wherein the volatile suspended solids are reduced by about 30% in about five days.

19. The method of claim 15, wherein the volatile suspended solids are reduced by an amount in the range of about 23% to about 36% in about 18 days.

20. The method of claim 13, wherein the sewage comprises dissolved oxygen in an amount of at least about 0.5 ppm.

21. The method of claim 13, wherein the sewage comprises dissolved oxygen in an amount of at least about 1.0 ppm.

* * * * *